United States Patent
Mahoney et al.

(10) Patent No.: US 12,177,353 B2
(45) Date of Patent: *Dec. 24, 2024

(54) DYNAMIC ENCRYPTION MODEL

(71) Applicant: Synchrony Bank, Stamford, CT (US)

(72) Inventors: William Mahoney, Stamford, CT (US); Chidhambaram Pillai, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/506,647

(22) Filed: Nov. 10, 2023

(65) Prior Publication Data
US 2024/0154810 A1    May 9, 2024

Related U.S. Application Data

(63) Continuation of application No. 18/331,104, filed on Jun. 7, 2023, now Pat. No. 11,856,103.

(60) Provisional application No. 63/349,668, filed on Jun. 7, 2022.

(51) Int. Cl.
*H04L 9/32* (2006.01)
*G06F 9/54* (2006.01)
*H04L 9/30* (2006.01)

(52) U.S. Cl.
CPC ............ *H04L 9/3213* (2013.01); *G06F 9/547* (2013.01); *H04L 9/3073* (2013.01)

(58) Field of Classification Search
CPC ...... H04L 9/3213; H04L 9/3073; G06F 9/547
USPC .......................................................... 713/159
See application file for complete search history.

(56) References Cited

U.S. PATENT DOCUMENTS

| | | | |
|---|---|---|---|
| 10,979,289 B2 * | 4/2021 | Sidhartha | H04L 61/5014 |
| 11,252,140 B2 * | 2/2022 | Vudathu | H04L 63/0442 |
| 11,516,253 B1 * | 11/2022 | Van Deman, V | H04L 63/10 |
| 11,539,697 B1 * | 12/2022 | Senecal | H04L 63/0876 |
| 2011/0197065 A1 * | 8/2011 | Stauth | H04L 63/0876 380/278 |
| 2019/0207807 A1 * | 7/2019 | Mikhail | H04L 41/145 |
| 2020/0059372 A1 * | 2/2020 | Goeringer | H04L 9/007 |
| 2020/0112436 A1 * | 4/2020 | Kanukollu | H04L 9/3073 |
| 2021/0067337 A1 * | 3/2021 | Bahrami | H04L 9/06 |
| 2021/0117566 A1 * | 4/2021 | Kajava | H04L 9/0825 |
| 2021/0168602 A1 * | 6/2021 | Kim | H04W 12/041 |
| 2023/0122665 A1 * | 4/2023 | Pai | H04L 9/0822 713/2 |

(Continued)

OTHER PUBLICATIONS

Notice of Allowance mailed Aug. 17, 2023 in U.S. Appl. No. 18/331,104.

*Primary Examiner* — Thanh T Le
(74) *Attorney, Agent, or Firm* — Polsinelli LLP

(57) ABSTRACT

Systems and methods for a dynamic encryption model in which dynamic encryption keys are associated with an access token having an expiration time. The access token is generated for a user session of a user application seeking to make API calls to a service provider system. When the access token expires, or becomes otherwise invalid, the dynamic encryption keys are discarded, and any further API calls are made using an updated access token and updated dynamic encryption keys. The dynamic encryption keys are used to encrypt specially designated fields of API calls and/or API call results.

20 Claims, 8 Drawing Sheets

(56) References Cited

U.S. PATENT DOCUMENTS

| | | | |
|---|---|---|---|
| 2023/0131060 A1* | 4/2023 | Ko | H04L 9/3263 |
| | | | 713/151 |
| 2023/0177171 A1* | 6/2023 | Kushtagi | G06F 21/44 |
| | | | 713/155 |
| 2023/0177477 A1* | 6/2023 | Manikantan | G06Q 20/102 |
| | | | 705/40 |
| 2023/0205742 A1* | 6/2023 | Jamkhedkar | G06Q 20/4016 |
| | | | 707/692 |

* cited by examiner

DYNAMIC ENCRYPTION MODEL

CROSS-REFERENCE TO RELATED APPLICATIONS

The present application is a continuation of U.S. patent application Ser. No. 18/331,104 filed Jun. 7, 2023, which claims the benefit of U.S. Provisional Application No. 63/349,668, filed Jun. 7, 2022, titled "DYNAMIC ENCRYPTION MODEL," which is hereby incorporated by reference, in entirety and for all purposes.

FIELD

The present disclosure relates to systems and methods for providing a dynamic encryption model in which encryption key pairs are dynamically generated and shared between a service provider offering an application programming interface (API) and an entity seeking to access the API. Such encryption keys may be exchanged when an authenticated user, having a valid access token, seeks to make API calls. The access token may be issued for a user session, and be valid for a pre-determined period of time.

SUMMARY

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment", one or more embodiments, or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Figure 1:
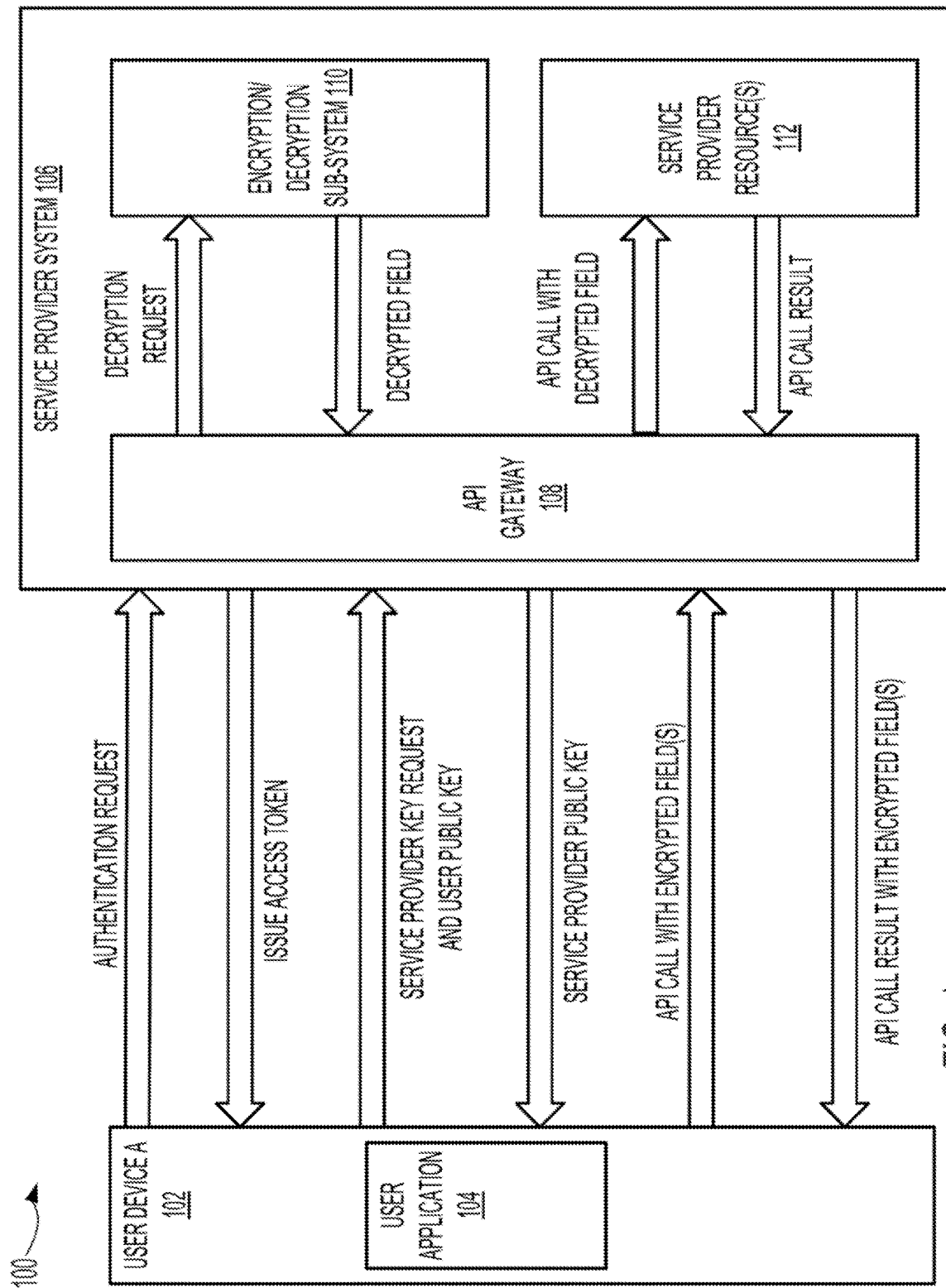
FIG. 1 shows an illustrative example of an environment in which a user device interacts with a service provider system in order to make one or more API calls in accordance with one or more embodiments described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive. The words "exemplary" and "example" are used herein to mean "serving as an example, instance, or illustration." Any embodiment or design described herein as "exemplary" is not necessarily to be construed as preferred or advantageous over other embodiments or designs.

Embodiments described herein may provide a framework for a service provider system and a user application to interact using an access key associated with an expiration time to exchange dynamic encryption keys associated with the access token for a session of the user application to make application programming interface (API) calls to one or more APIs of the service provider system. The dynamic encryption keys may be used to encrypt specially designated fields of an API call made by the user application and/or fields of any response to the API call from the service provider system. The dynamic encryption keys may be discarded or otherwise no longer used upon expiration of the associated access token, and new encryption keys may be exchanged upon issuance of an updated access token.

A service provider may be an entity that provides one or more services to users. In some instances, a service provider may maintain an application programming interface (API), which remote user applications (e.g., native applications, single page applications (SPAs), etc. executing on a user device) may use to make API calls to access or otherwise interact with the services of the service provider via one or more APIs exposed by the service provider system. Such user applications may allow a user to initiate a user session by providing authentication information (e.g., a username and password, biometric information, etc.).

Once the authentication information has been provided and successfully verified, the service provider system may provide an access token (e.g., an OAuth 2.0 access token) to the user application. An access token may identify the user, the user session, any privileges or permissions granted to the user application, and/or include any other information. As an example, an access token may include information that allows a service provider system to discern which API calls the user application is allowed to make to one or more APIs of the service provider system. An access token may also include or otherwise be associated with an expiration time. For example, an access token may be configured to expire after sixty minutes.

In one or more embodiments, in order to make API calls to one or more APIs of a service provider system, the user application may generate a dynamic public-private encryption key pair (which may be referred to as a user private key and a user public key), and transmit the user public key and access token to the service provider system, as part of a request for a public key from the service provider. In one or more embodiments, the service provider system receives the request, stores the user public key, creates an association between the access token and the user public key, and generates a service provider public key and service provider private key, which are also associated with the access token. In one or more embodiments, the service provider then transmits the service provider public key to the user application.

In one or more embodiments, once the user application receives the service provider public key, the user application may make API calls to the service provider system. In one or more embodiments, to make such an API call, the user application assesses the API call to determine if any fields therein require encryption. One or more fields of an API call may require that the user application provide information that may be deemed sensitive, and such fields may be designated as requiring encryption. In one or more embodiments, a field that requires encryption may be designated as such in an identifiable way. As an example, a character string may be associated with a field, such as appending "cipher" to the field name (e.g., cipher.accountId to dictate that the account identifier field should be encrypted). Any number of fields in a given API call may be designated for encryption.

In one or more embodiments, the user application uses the service provider public key to encrypt any fields in the API call that are designated for encryption. Next, in one or more embodiments, the user application transmits the API call, along with the access token, to the service provider system. In one or more embodiments, the service provider first assesses the access token to verify that the user application session has appropriate permissions to make the requested API call. In one or more embodiments, if the verification is successful, the service provider system obtains the service provider private key associated with the access token, and decrypts any encrypted fields to obtain a decrypted API call.

In one or more embodiments, the service provider performs an API action using the decrypted API call to obtain an API call result. Examples of API actions include, but are not limited to, obtaining information items, updating information items, adding information items, deleting information items, etc. In one or more embodiments, the API call result may be provided to the user application. However, all or any portion of the API call result may include information deemed sensitive, and thus require encryption. As with the API call made by the user application, portions of the API call result may be designated for encryption in an identifiable manner. In one or more embodiments, before transmitting an API call result, the service provider system assesses the API call result to determine if any portion thereof is designated as requiring encryption. In one or more embodiments, if one or more portions of the API call result are so designated, the service provider system obtains the user public key associated with the access token provided with the API call from the user application, and encrypts the relevant portions of the API call result using the user public key. In one or more embodiments, upon receipt of an API call result from a service provider system having one or more encrypted portions, the user application decrypts the one or more portions using the user private key to obtain a decrypted API call result.

In one or more embodiments, when the user application session expires (e.g., due to lack of user activity), the access token, the user public and private keys, and the service provider public and private keys may be discarded or otherwise no longer used. In one or more embodiments, in the event that a user session remains active beyond the expiration time associated with the access token, the user application may be issued an updated access token (e.g., based on a refresh token), and new encryption keys will be generated and exchanged by the user application and the service provider system to facilitate the user application making additional API calls to the service provider system.

FIG. 1A shows an illustrative example of an environment 100 in which a user device 102 interacts with a service provider system 106 in order to make one or more API calls. The user device 102 may be a computing device such as the computing device 802 described herein at least in connection with FIG. 8. The computing device may be, for example, a laptop computer, a desktop computer, a smartphone, a tablet, a smart watch, or any other type of computing device such as those described herein. The user device 102 may be a device owned by or otherwise provided to an individual user (not shown). The user device 102 may be a device owned by or otherwise controlled by an entity (e.g., a retailer) that has a relationship with the service provider associated with the service provider system 106. As an example, a retailer may have a physical establishment in which a user device 102 is in communication with the service provider system 106, and may be used to apply for credit, access account information, etc.

In one or more embodiments, the user device 102 includes any number of applications, such as the user application 104. The user application 104 may be an application or other executable process executing on the user device 102. The user application may be a single page application (SPA) executing in a browser of the user device 102, a native application executing on the user device 102, a progressive web application (PWA), a multi-page application (MPA), etc. The user application 104 may be any other form of an application or program without departing from the scope of embodiments described herein. The user application 104 may be provided by a service provider associated with service provider system 106, or may be provided from any other entity, such as a third-party entity that has a relationship with the service provider associated with the service provider system 106.

Figure 8:
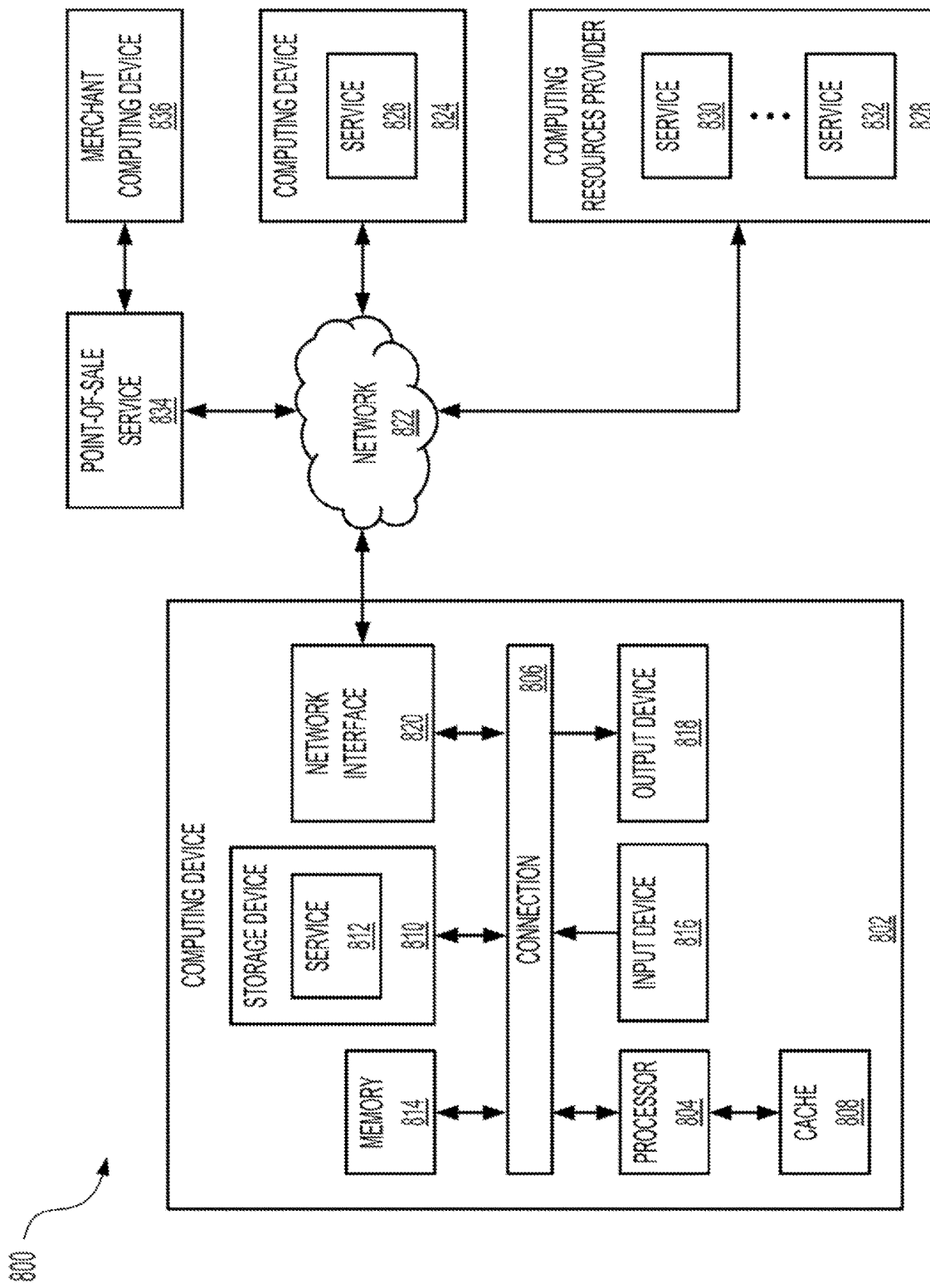
FIG. 8 shows a computing system architecture including various components in electrical communication with each other using a connection in accordance with various embodiments.

The service provider system 106 may be one or more computing devices such as the computing device 802 described herein at least in connection with FIG. 8. As an example, the service provider system 106 may be one or more server computing devices controlled or otherwise used by a service provider (not shown). As used herein, a service provider may be any entity that provides services of any type. As an example, a service provider may be a financial institution, retailer, etc. that provides various services to users having one or more accounts with the service provider (e.g., account access, account summary information, account update capabilities, account details information, upcoming payment deadlines, etc.).

In one or more embodiments, the service provider system 106 maintains or otherwise provides one or more APIs to which the user application 104 may make API calls via an API gateway 108. The API gateway 108 may be implemented on one or more computing devices of the service provider system 106, or any portion thereof. Alternatively, the API gateway 108 may be implemented as an application or other executable process on one or more computing devices of the service provider system 106. In one or more embodiments, the API gateway 108 exposes one or more APIs of the service provider system 106 to user applications, so that the user applications may, via the API gateway 108, request the service provider to perform various actions, functionality, etc. In one or more embodiments, the API gateway 108 is configured to service API calls received from user applications, such as, for example, user application 104. In one or more embodiments, an API call is a request made by the user application 104 to the API gateway 108 of the service provider system 106 to perform one or more API actions, such as retrieving information, updating information, deleting information, adding information, performing various operations, methods, functions, etc.

In one or more embodiments, prior to the user application 104 making API calls to the API gateway 108, an authenticated user application session is initiated. In one or more embodiments, to initiate an authenticated user application session, the user application 104 transmits an authentication request to the service provider system. In one or more embodiments, an authentication request includes any information which may be subjected to a verification process by the service provider system 106 in order to authenticate the user (not shown) of the user application 104. An authentication request may include an identifier associated with a user (e.g., username, email address, etc.) and some number of other information items that allow the service provider system 106 to verify the identity of the user. As an example, the service provider system may employ single factor authentication and require a username and password. As another example, the authentication request may include biometric information (e.g., facial scan, fingerprint, etc.) of the user. An authentication request may include any number of discrete steps without departing from the scope of embodiments described herein. As an example, a user, via the user application 104, may provide a username and password as part of the authentication request to the service provider system 106. However, the service provider system 106 may additionally check whether the user device 102 on which the user application 104 executes is recognized by the service provider system (e.g., the user has previously been authenticated when using the user application 104 on the user device 102). When the user device 102 is not recognized, the service provider system 106 may require additional information to authenticate the user (e.g., multifactor authentication), such as providing a unique code provided to a separate device associated with the user (e.g., a user mobile device (not shown)). In one or more embodiments, the authentication is performed by the service provider system using API calls to an authentication service API of the service provider system 106.

In one or more embodiments, once the service provider system 106 successfully verifies the authentication request, and authenticates the user, the service provider system 106 issues an access token to the user application 104. Issuing the access token may be the direct response to the authentication request, or may include any number of discrete steps leading to issuance of the access token to the user application 104. For example, after authenticating the user, the service provider system may return a hypertext transfer protocol secure (HTTPS) 302 response to the user application that includes a code, thereby redirecting the user application 104 to a separate uniform resource locator (URL) or uniform resource identifier (URI) from which the user application 104 requests the access token. An access token may include any information to be used when the user application 104 interacts with the service provider system 106. Examples of information included in an access token may include, but are not limited to, an identifier of the user, an identifier of the user application, an identifier of a particular session (i.e., of the user using the user application 104), any privileges and/or permissions the user has for the service provider system (e.g., API calls to one or more service provider APIs that the user application is allowed to make), information about the access token (e.g., type of token, algorithm used to generate the token, etc.), and/or verification data to allow the user application to verify the source of the access token (i.e., the service provider system). The access token may also include an expiration time that determines the length of time for which the access token remains valid for accessing the service provider system 106 and any APIs exposed therefrom. As an example, the access token may be a JavaScript Object Notation (JSON) Web Token (JWT) that includes a header with the type of token (i.e., JWT) and the algorithm used to create it, a payload with claims defining which resources of the service provider system 106 may be accessed by the user application 104 and setting an expiration time for the token, and a signature portion with information allowing the JWT to be securely validated. In one or more embodiments, the access token is stored by the user application 104 (e.g., as part of the user application state) to be used when the user application 104 interacts with the service provider system 106.

In one or more embodiments, the user application 104 is configured to interact, at least in part, with the service provider system 106 via one or more APIs exposed by the service provider system 106 via the API gateway 108. To interact with the one or more APIs of the service provider system 106, the user application may make API calls to the API gateway 108 of the service provider system 106. In one or more embodiments, an API call is a request made to an API for one or more actions to be performed. Such actions may include, but are not limited to, obtaining information (e.g., accessing account information for one or more accounts), updating information, deleting information, executing a method, process, function, etc. As an example, the service provider may be an entity that provides any number of user accounts for credit cards, bank accounts, etc., and API calls may be made by user application 104 to the service provider system 106 to perform actions such as accessing account information, updating account information, viewing account summaries and account details, viewing payment history, viewing account balances, making payments, filing disputes, etc.

In one or more embodiments, an API call may include one or more fields or portions in which information is to be provided. The information to be provided in any number of such fields of a given API call may be deemed sensitive. As an example, the service provider may deem certain fields as sensitive data, such as an account identifier, personally identifiable information (e.g., name, date of birth, email address, phone number, Internet Protocol (IP address), passport number, account number(s) all or any portion of a social security number, etc.), information subject to the Payment Card Industry Data Security Standard (PCI DSS), protected health information (PHI), etc. In one or more embodiments, when an API call includes one or more fields or portions deemed sensitive, such fields or portions may be required to be encrypted to make the API call, so that the information if the one or more fields or portions of the API call is not exposed. Therefore, one or more fields or portions of an API call may be designated as requiring encryption. Such a designation may be made in any manner identifiable by the user application 104. As an example, a given field or portion of an API call may be associated with a character string (e.g., "cipher") that designates the field or portion as having been deemed sensitive, and requiring encryption. In such an example, the account identifier field may be so designated with "cipher.accountId", which indicates to the user application that the account identifier field should be encrypted.

In one or more embodiments, in order to have the ability to encrypt fields or portions of an API call, the user application 104 first generates a user public key and a user private key (e.g., a user public-private key pair). The encryption keys may be generated using any suitable method for generating encryption keys, such as, for example, the Rivest Shamir Adleman (RSA) algorithm, the digital signature algorithm (DSA), etc. Any other encryption key technique may be used without departing from the scope of embodiments described herein. The keys may be of any length (e.g., 2048 bits). In one or more embodiments, the user private key is stored by the user application 104 (e.g., in user application state) to be used for decrypting information received from the service provider system 106 (e.g., one or more fields or portions of an API call result returned to the user application 104 in response to an API call).

In one or more embodiments, the user application 104 next requests a public key from the service provider system 106 (i.e., a service provider public key). In one or more embodiments, the request includes the access token and the user public key. In one or more embodiments, the API gateway 108 of the service provider system 106 receives the request, and verifies the access token (e.g., verifies that the access token includes permissions for the user application 104 to make API calls to the service provider system 106). In one or more embodiments, the access token also identifies the particular user session for which the access token was issued. In one or more embodiments, when the verification of the access token is successful, the user public key is associated with the access token and, therefore, with the user session. The user public key and information corresponding to the access token may be stored in an encryption/decryption sub-system 110 of the service provider system 106. The encryption/decryption sub-system 110 may be implemented on one or more computing devices of the service provider system 106, or any portion thereof. Alternatively, the encryption/decryption sub-system 110 may be implemented as an application or other executable process on one or more computing devices of the service provider system 106. In one or more embodiments, the user public key is obtained by the API gateway 108 when an API call with the access token is received from the user application 104, and used to encrypt any fields or portions of an API call results that include information that is deemed sensitive. In one or more embodiments, the service provider system also generates a service provider private key and a service provider public key (i.e., a service provider public-private key pair). In one or more embodiments, the service provider private key is also stored in the encryption/decryption sub-system 110 associated with information corresponding to the access token to be used for decrypting encrypted portions of API calls received, along with the access token, from the user application 104. In one or more embodiments, the service provider system 106 transmits the service provider public key to the user application 104, to be used for encrypting fields or portions of API calls made to the API gateway 108 of the service provider system 106. The service provider public key may be stored by the user application 104 (e.g., as part of the user application state).

In one or more embodiments, as discussed above, the user application 104 interacts, at least in part, with the service provider system 106 by making API calls to the API gateway 108 of the service provider system 106. In one or more embodiments, to make an API call, the user application 104 first assesses the API call to determine if any fields or portions of the API call are designated as requiring that the user application provide information deemed sensitive, and thus requiring encryption. In one or more embodiments, when one or more such fields or portions of an API call are identified, the user application 104 obtains the service provider public key, and uses the service provider public key to encrypt the one or more fields or portions of the API call. In one or more embodiments, the user application 104 then transmits the API call with the one or more encrypted fields or portions to the API gateway 108 of the service provider system 106, along with the access token.

In one or more embodiments, when the API gateway 108 receives the API call and access token from the user application 104, the API gateway 108 first validates that the access token is valid (e.g., it has not expired), and that the access token indicates that the user application has appropriate permissions to make the API call. In one or more embodiments, if the access token is not valid and/or the access token indicates that the user application 104 is not allowed to make the API call, the API gateway does not service the API call. In such a scenario, the API gateway may transmit a denial to the user application 104 indicating that the API call cannot be made, and may also include information relating to the reason(s) for the denial (e.g., access token is expired). In one or more embodiments, when the API gateway 108 determines that the access token is valid and that the user application 104 has permission to make the API call, the API gateway determines whether one or more fields or portions of the API call are encrypted. In one or more embodiments, when one or more fields or portions of the API call are encrypted, the API gateway 108 obtains the service provider private key associated with the access token from the encryption/decryption sub-system 110, and uses the service provider private key to decrypt the encrypted fields or portions of the API call to obtain a decrypted API call.

In one or more embodiments, the decrypted API call is used to perform an API action requested by the API call. The API action may be performed using service provider resource(s) 112. The service provider resource(s) 112 may be implemented on one or more computing devices of the service provider system 106, or any portion thereof. Alternatively, the service provider resource(s) 112 may be implemented as an application or other executable process on one or more computing devices of the service provider system 106. The service provider resources 112 may include any resources of the service provider system 106 that may be used to service an API call. As an example, the service provider resources 112 may include storage (e.g., storage device 810 of FIG. 8) that includes any number of data structures of any type that store information related to one or more user accounts of the user of the user application 104. The API call may be requesting an API action to retrieve such information, update the information, delete the information, add additional information, etc.

In one or more embodiments, the API gateway 108 performs the API action requested by the decrypted API call using the service provider resource(s) 112 to obtain an API call result. As an example, if the API call was a request for information (e.g., a user account summary), the API call result may include the requested information. As another example, if the API call was a request to update information (e.g., update an address associated with the user account), the API call result may include a confirmation that the information was successfully updated. As another example, if the API call was a request that a certain action be performed (e.g., a payment be made towards the balance of a credit account), then the API call result may include a confirmation that the action was performed.

In one or more embodiments, an API call result may include one or more fields or portions in which information is to be provided. The information to be provided in any number of such fields may be deemed sensitive. As an example, the service provider may deem certain fields as sensitive data, such as an account identifier, personally identifiable information (e.g., name, date of birth, email address, phone number, Internet Protocol (IP address), passport number, account number(s) all or any portion of a social security number, etc.), information subject to the Payment Card Industry Data Security Standard (PCI DSS), protected health information (PHI), etc. In one or more embodiments, when an API call result includes one or more fields or portions deemed sensitive, such fields or portions may be required to be encrypted before transmitting the API call result to the user application 104, so that the information if the one or more fields or portions of the API call result are not exposed. Therefore, one or more fields or portions of an API call result may be designated as requiring encryption. Such a designation may be made in any manner identifiable by the API gateway 108. As an example, a given field or portion of an API call result may be associated with a character string (e.g., "cipher") that designates the field or portion as having been deemed sensitive, and requiring encryption. In such an example, a last name field identifier field may be so designated with "cipher.LastName", which indicates to the API gateway 108 that the last name field should be encrypted.

In one or more embodiments, when the API gateway 108 identifies one or more fields or portions in the API call result that are designated as requiring encryption, the API call gateway 108 obtains the user public key associated with the access token from the encryption/decryption sub-system 110, and uses the user public key to encrypt the fields or portions of the API call result designated as requiring encryption. In one or more embodiments, the API call result with one or more encrypted fields or portions is then transmitted to the user application 104 of the user device 102.

In one or more embodiments, when the user application 104 receives the API call result, the user application first determines whether the API call result includes any encrypted fields or portions. In one or more embodiments, when the API call result includes encrypted fields or portions, the user application obtains the user private key and decrypts the encrypted fields or portions to obtain a decrypted API call result. As an example, the API call result may include an account summary requested by the API call, which has several encrypted fields. In such a scenario, the user application uses the user private key to decrypt the encrypted fields before displaying the account summary to the user via a user interface.

In one or more embodiments, the association of the user public-private key pair and the service provider public-private key pair with the access token having an expiration time makes the key pairs dynamic, as the key pairs are only valid while the access token remains valid. When the access token is no longer valid, the user application 104 must obtain an updated access token, and generate and exchange new key pairs, to make further API calls to the service provider system 106. As an example, if the user session ends (e.g., due to user logout, user inactivity, etc.), the access token generated for the session is no longer valid, and the associated keys are discarded or otherwise no longer usable for servicing API calls from the user application 104 to the service provider system 106. As another example, if the user session remains active for longer than the expiration time associated with the access token, then the access token expires, and the associated keys are discarded or otherwise no longer usable for servicing API calls from the user application 104 to the service provider system 106. In either scenario, to make additional API calls, the user application 104 must request a new access token, which may or may not require re-authentication of the user. In one or more embodiments, when an updated access token is issued to the user application 104, a new set of dynamic encryption key pairs (e.g., user and service provider) are generated and exchanged in order to facilitate additional API calls made by the user application 104.

In one or more embodiments, using dynamic encryption keys that only remain valid and usable during the time when an associated access token for a given user session is valid and/or has not expired reduces the risk that the keys stored by the user application and/or the service provider may be compromised, eliminates the need to store the encryption keys for periods of time longer than a given user session, and eliminates any overhead that may be associated with implementing a key rotation scheme. Additionally, the dynamic encryption model described herein may encrypt portions of API calls that might be otherwise unencrypted by other encryption techniques, such as Transport Layer Security (TLS) encryption, as the encryption occurs at the level of fields of an API call, and the dynamic encryption described herein may also encrypt fields that are further encrypted by another encryption scheme such as TLS encryption.

FIG. 1B FIG. 1A shows an illustrative example of an environment 101. The environment 101 is similar to the environment 100, but with an alternate structure for the service provider system 106, such that the service provider system 106 of FIG. 1A may be configured as a distributed set of special purpose computers to implement the sub-system 110 and the provider resource 112 independently or in different configurations, rather than as the service provider system 106 of FIG. 1A. Similarly, while aspects of user devices 102 that interact with a service provider system 106 in order to make one or more API calls are described above, in alternate aspects such as the environment 101, user devices 102 can be configured as special purpose computing devices as modified by, for example, instructions that can be part of the user application 104. Such a special purpose computing device can be, for example, a laptop computer, a desktop computer, a smartphone, a tablet, a smart watch, or any other type of computing device such as those described herein.

Figure 2:
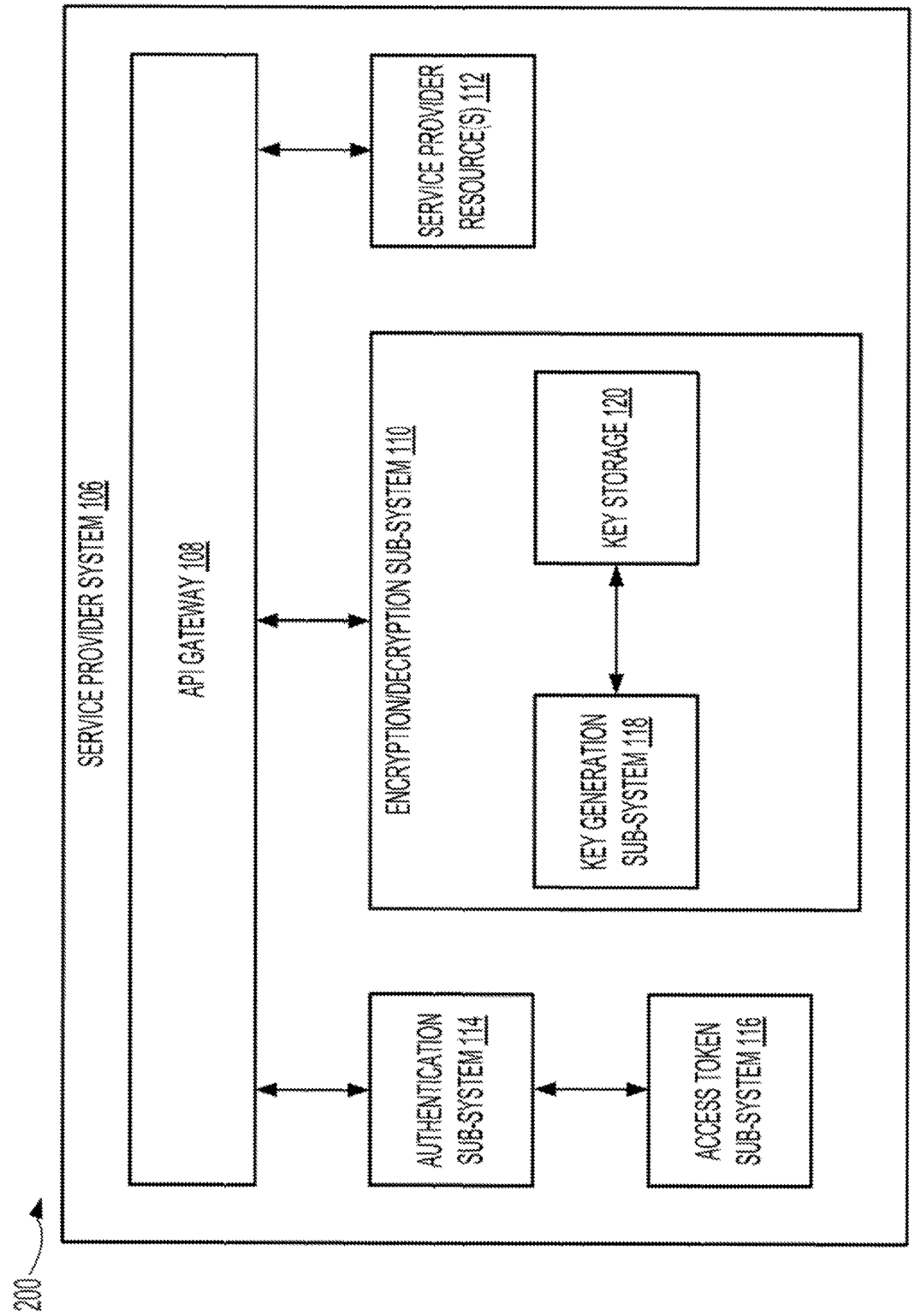
FIG. 2 shows an illustrative example of an environment 200 that includes a service provider system for servicing API calls from a user application in accordance with one or more embodiments described herein.

FIG. 2 shows an illustrative example of an environment 200 that includes a service provider system 106. The service provider system 106 may be one or more computing devices such as the computing device 802 described herein at least in connection with FIG. 8. As an example, the service provider system 106 may be one or more server computing devices controlled or otherwise used by a service provider (not shown). As used herein, a service provider may be any entity that provides services of any type. As an example, a service provider may be a financial institution, retailer, etc. that provides various services to users having one or more accounts with the service provider (e.g., account access, account summary information, account update capabilities, account details information, upcoming payment deadlines, etc.).

As discussed above, the service provider system 106 may expose any number of APIs to any number of user applications (not shown) executing on user devices (not shown), which may make API calls to request API actions performed using service provider resources 112. The service provider resource(s) 112 may be implemented on one or more computing devices of the service provider system 106, or any portion thereof. Alternatively, the service provider resource(s) 112 may be implemented as an application or other executable process on one or more computing devices of the service provider system 106. The service provider resources 112 may include any resources of the service provider system 106 that may be used to service an API call. As an example, the service provider resources 112 may include storage (e.g., storage device 810 of FIG. 8) that includes any number of data structures of any type that store information related to one or more user accounts of the user of the user application 104. The API call may be requesting an API action to retrieve such information, update the information, delete the information, add additional information, etc.

In one or more embodiments, the service provider system 106 includes an API gateway 108. The API gateway 108 may be implemented on one or more computing devices of the service provider system 106, or any portion thereof. Alternatively, the API gateway 108 may be implemented as an application or other executable process on one or more computing devices of the service provider system 106. In one or more embodiments, the API gateway 108 exposes one or more APIs of the service provider system 106 to user applications, so that the user applications may, via the API gateway 108, request the service provider to perform various actions, functionality, etc. In one or more embodiments, the API gateway 108 is configured to service API calls received from user applications, such as, for example, user application 104. In one or more embodiments, an API call is a request made by the user application 104 to the API gateway 108 of the service provider system 106 to perform one or more API actions, such as retrieving information, updating information, deleting information, adding information, performing various operations, methods, functions, etc.

In one or more embodiments, prior to a user application (not shown) making API calls to the API gateway 108, an authenticated user application session is initiated. In one or more embodiments, to initiate an authenticated user application session, the user application transmits an authentication request to the service provider system. In one or more embodiments, an authentication request includes any information which may be subjected to a verification process by the service provider system 106 in order to authenticate the user (not shown) of the user application. An authentication request may include an identifier associated with a user (e.g., username, email address, etc.) and some number of other information items that allow the service provider system 106 to verify the identity of the user. As an example, the service provider system may employ single factor authentication and require a username and password. As another example, the authentication request may include biometric information (e.g., facial scan, fingerprint, etc.) of the user. An authentication request may include any number of discrete steps without departing from the scope of embodiments described herein. As an example, a user, via the user application, may provide a username and password as part of the authentication request to the service provider system 106. However, the service provider system 106 may additionally check whether the user device on which the user application executes is recognized by the service provider system (e.g., the user has previously been authenticated when using the user application on the user device). When the user device is not recognized, the service provider system 106 may require additional information to authenticate the user (e.g., multifactor authentication), such as providing a unique code provided to a separate device associated with the user (e.g., a user mobile device (not shown)).

In one or more embodiments, the authentication is performed by the API gateway 108 using one or more API calls to an authentication sub-system 114 of the service provider system 106. The authentication sub-system 114 may be implemented on one or more computing devices of the service provider system 106, or any portion thereof. Alternatively, the authentication sub-system 114 may be implemented as an application or other executable process on one or more computing devices of the service provider system 106. In one or more embodiments, the authentication sub-system 114 includes and/or has access to one or more data structures (not shown) that may be used to authenticate a user in response to an authentication request. As an example, an authentication request may include a username and passcode. The authentication sub-system 114 may include a data structure that includes usernames associated with a hash of a passcode corresponding to the username. The API gateway 108 may make an API call to the authentication sub-system 114 that includes the username and passcode, and the authentication sub-system 114 performs a hash of the passcode. The result may then be compared with the hash in the data structure to determine if there is a match, which indicates the password is correct. Similar series of events may occur using information other than passcodes without departing from the scope of embodiments described herein. As an example, a different form of information may be provided as part of the authentication request API call from the API gateway 108 to the authentication sub-system 114, such as biometric information (e.g., face scan information, fingerprint information, iris scan information, etc.), or information gained from a card swiped on or inserted into the user device by a user.

In one or more embodiments, the authentication sub-system 114 may require additional steps be performed to authenticate a user in response to an authentication request. As an example, the user may be required to perform two factor authentication, which may, for example, require that the user access a separate application on a separate mobile device of the user to interact with an interactive element within the application to further verify the identity of the user. As another example, the authentication sub-system 114 may be configured to determine whether the user device from which the authentication request originated is a recognized device associated with the user. If the user device is not recognized, the user may be asked for a communication channel (e.g. email, text message) to which the authentication sub-system 114 may transmit a one-time code, which the user must obtain and enter in order to become authenticated. The authentication techniques described herein, and any other authentication techniques, may be used in any combination in order to authenticate a user of a user application. As an example, authentication by the authentication sub-system 114 may require multi-factor authentication (e.g., password, then biometric information, then answering a pre-determined security question (e.g., "What street did you grow up on?")) and further verification of an unrecognized user device.

In one or more embodiments, once the authentication request is satisfied (i.e., the user is successfully authenticated), a user session is initiated for the user application from which the authentication request was received. In one or more embodiments, to facilitate at least a portion of interactions between the user application and the service provider system 106 during the authenticated user session, the authentication sub-system 114 may request an access token from an access token sub-system 116 of the service provider system 106. The access token sub-system 116 may be implemented on one or more computing devices of the service provider system 106, or any portion thereof. Alternatively, the access token sub-system 116 may be implemented as an application or other executable process on one or more computing devices of the service provider system 106. In one or more embodiments, the access token sub-system 116 is configured to generate access tokens for authenticated user sessions when requested by the authentication sub-system 114. An access token may include any information to be used when the user application interacts with the service provider system 106. Examples of information included in an access token, may include, but are not limited to, an identifier of the user, an identifier of the user application, an identifier of a particular session (i.e., of the user using the user application), any privileges and/or permissions the user has for the service provider system 106 (e.g., API calls to one or more service provider APIs that the user application is allowed to make), information about the access token (e.g., type of token, algorithm used to generate the token, etc.), and/or verification data to allow the user application to verify the source of the access token (i.e., the service provider system). The access token may also include an expiration time that determines the length of time for which the access token remains valid for accessing the service provider system 106 and any APIs exposed therefrom. As an example, the access token may be a JavaScript Object Notation (JSON) Web Token (JWT) that includes a header with the type of token (i.e., JWT) and the algorithm used to create it, a payload with claims defining which resources of the service provider system 106 may be accessed by the user application 104 and setting an expiration time for the token, and a signature portion with information allowing the JWT to be securely validated. In one or more embodiments, the access token is stored by the user application 104 (e.g., as part of the user application state) to be used when the user application 104 interacts with the service provider system 106.

In one or more embodiments, whether an access token is valid may be determined by the service provider system 106 (e.g., by the authentication sub-system 114 and/or the access token sub-system 116). As an example, when the access token is generated by the access token sub-system 116, the expiration time may be set (e.g., 3600 seconds) and recorded. In such a scenario, when an API call is received with the access token, the time may be determined to verify whether the expiration time has been exceeded, in which case the access token is expired, and an invalid access token denial of the API call may be returned to the user application, which may then request an updated access token. In one or more embodiments, whether an access token is expired may be determined by the user application to which the access token was issued. As an example, if the user logs out of the user application, or remains inactive for a pre-determined period of time (e.g., five minutes), then the user application may discard and no longer use the access token to interact with the service provider system 106. As another example, the user application may be configured to check whether the expiration time of the access token has been exceeded prior to sending the access token as part of an API call to the service provider system and, if so, request an updated access token. Both the service provider system and the user application may verify whether an access token is expired (as described above) without departing from the scope of embodiments described herein.

In one or more embodiments, after an access token has been generated by the access token sub-system 116, and provided to a user application via the API gateway 108, the API gateway 108 may receive a request for a service provider public key, with which the user application will encrypt fields or portions of API calls made to the API gateway 108. The request may include the access token, as well as a user public key, which the service provider system 106 may use to encrypt fields or portions of API call results to be transmitted to the user application. In one or more embodiments, the service provider system 106 (e.g., using the authentication sub-system 114) verifies the access token, and stores the user public key in key storage 120 associated with information corresponding to the access token. In one or more embodiments, the key storage 120 is a storage device, such as storage device 810 shown in FIG. 8 and described below.

In one or more embodiments, the service provider system 106 then requests generation of a service provider public key and a service provider private key from a key generation sub-system 118. The key generation sub-system 118 may be implemented on one or more computing devices of the service provider system 106, or any portion thereof. Alternatively, the key generation sub-system 118 may be implemented as an application or other executable process on one or more computing devices of the service provider system 106. The dynamic encryption keys may be generated using any suitable method for generating encryption keys, such as, for example, the Rivest Shamir Adleman (RSA) algorithm, the digital signature algorithm (DSA), etc. Any other encryption key technique may be used without departing from the scope of embodiments described herein. The keys may be of any length (e.g., 4096 bits). In one or more embodiments, the service provider public key is transmitted to the user application to be used to encrypt fields or portions of API calls deemed to include sensitive information. In one or more embodiments, the service provider private key is used to decrypt fields or portions of API calls encrypted with the service provider public key, and is stored in the key storage 120 associated with information corresponding to the access token issued to the user application.

In one or more embodiments, when the API gateway 108 receives an API call with an access token, the API gateway may, via the authentication sub-system 114, verify the access token by verifying that the access token has not expired, and verifying that the access token indicates that the user application from which the API call was received has appropriate permissions to make the API call. In one or more embodiments, once the access token is so verified, the API gateway determines whether the API call includes any encrypted fields or portions. In one or more embodiments, when the API call includes encrypted fields or portions, the API call may request that an encryption/decryption sub-system 110 decrypt the encrypted fields or portions of the API call. The encryption/decryption sub-system 110 may be implemented on one or more computing devices of the service provider system 106, or any portion thereof. Alternatively, the encryption/decryption sub-system 110 may be implemented as an application or other executable process on one or more computing devices of the service provider system 106. In one or more embodiments, the encryption/decryption sub-system 110, in response to the request, obtains the service provider private key associated with the access token from the key storage 120, and uses the service provider private key to perform the decryption. By having the encrypted fields or portions of the API call decrypted by the encryption/decryption sub-system 110, the API gateway 108 obtains a decrypted API call.

In one or more embodiments, the decrypted API call is used to perform an API action requested by the API call. The API action may be performed using service provider resource(s) 112. The service provider resource(s) 112 may be implemented on one or more computing devices of the service provider system 106, or any portion thereof. Alternatively, the service provider resource(s) 112 may be implemented as an application or other executable process on one or more computing devices of the service provider system 106. The service provider resources 112 may include any resources of the service provider system 106 that may be used to service an API call. As an example, the service provider resources 112 may include storage (e.g., storage device 810 of FIG. 8) that includes any number of data structures of any type that store information related to one or more user accounts of the user of the user application 104. The API call may be requesting an API action to retrieve such information, update the information, delete the information, add additional information, etc.

In one or more embodiments, the API gateway 108 performs the API action requested by the decrypted API call using the service provider resource(s) 112 to obtain an API call result. As an example, if the API call was a request for information (e.g., a user account summary), the API call result may include the requested information. As another example, if the API call was a request to update information (e.g., update an address associated with the user account), the API call result may include a confirmation that the information was successfully updated. As another example, if the API call was a request that a certain action be performed (e.g., a payment be made towards the balance of a credit account), then the API call result may include a confirmation that the action was performed.

In one or more embodiments, an API call result may include one or more fields or portions in which information is to be provided. The information to be provided in any number of such fields may be deemed sensitive, as discussed above in the description of FIG. 1A. In one or more embodiments, when the API gateway 108 identifies one or more fields or portions in the API call result that are designated as requiring encryption, the API call gateway 108 may request that the encryption/decryption sub-system 110 encrypt the fields or portions of the API call result designated for encryption. In order to perform the encryption, the encryption/decryption sub-system 110 may obtain the user public key associated with the access token from the key storage 120, and perform the encryption using the user public key.

In one or more embodiments, when the user application 104 receives the API call result, the user application first determines whether the API call result includes any encrypted fields or portions. In one or more embodiments, when the API call result includes encrypted fields or portions, the user application obtains the user private key and decrypts the encrypted fields or portions to obtain a decrypted API call result. As an example, the API call result may include an account summary requested by the API call, which has several encrypted fields. In such a scenario, the user application uses the user private key to decrypt the encrypted fields before displaying the account summary to the user via a user interface.

In one or more embodiments, the association of the user public-private key pair and the service provider public-private key pair with the access token having an expiration time makes the key pairs dynamic, as the key pairs are only valid while the access token remains valid. When the access token is no longer valid, the user application must obtain an updated access token to make further API calls to the service provider system 106. As an example, if the user session ends (e.g., due to user logout, user inactivity, etc.), the access token generated for the session is no longer valid, and the associated keys are discarded or otherwise no longer usable for servicing API calls from the user application to the service provider system 106. As another example, if the user session remains active for longer than the expiration time associated with the access token, then the access token expires, and the associated keys are discarded from the key storage 120 or otherwise no longer usable for servicing API calls from the user application to the service provider system 106. In either scenario, to make additional API calls, the user application must request a new access token, which may or may not require re-authentication of the user via the authentication sub-system 114. In one or more embodiments, when an updated access token is generated by the access token sub-system 116 and issued to the user application, a new set of dynamic encryption key pairs (e.g., user and service provider) are generated (e.g., the service provider public key and service provider private key are generated by the key generation sub-system 118, and the user public and private key are generated by the user application) and exchanged in order to facilitate additional API calls made by the user application to the API gateway 108 of the service provider system 106.

Figure 3:
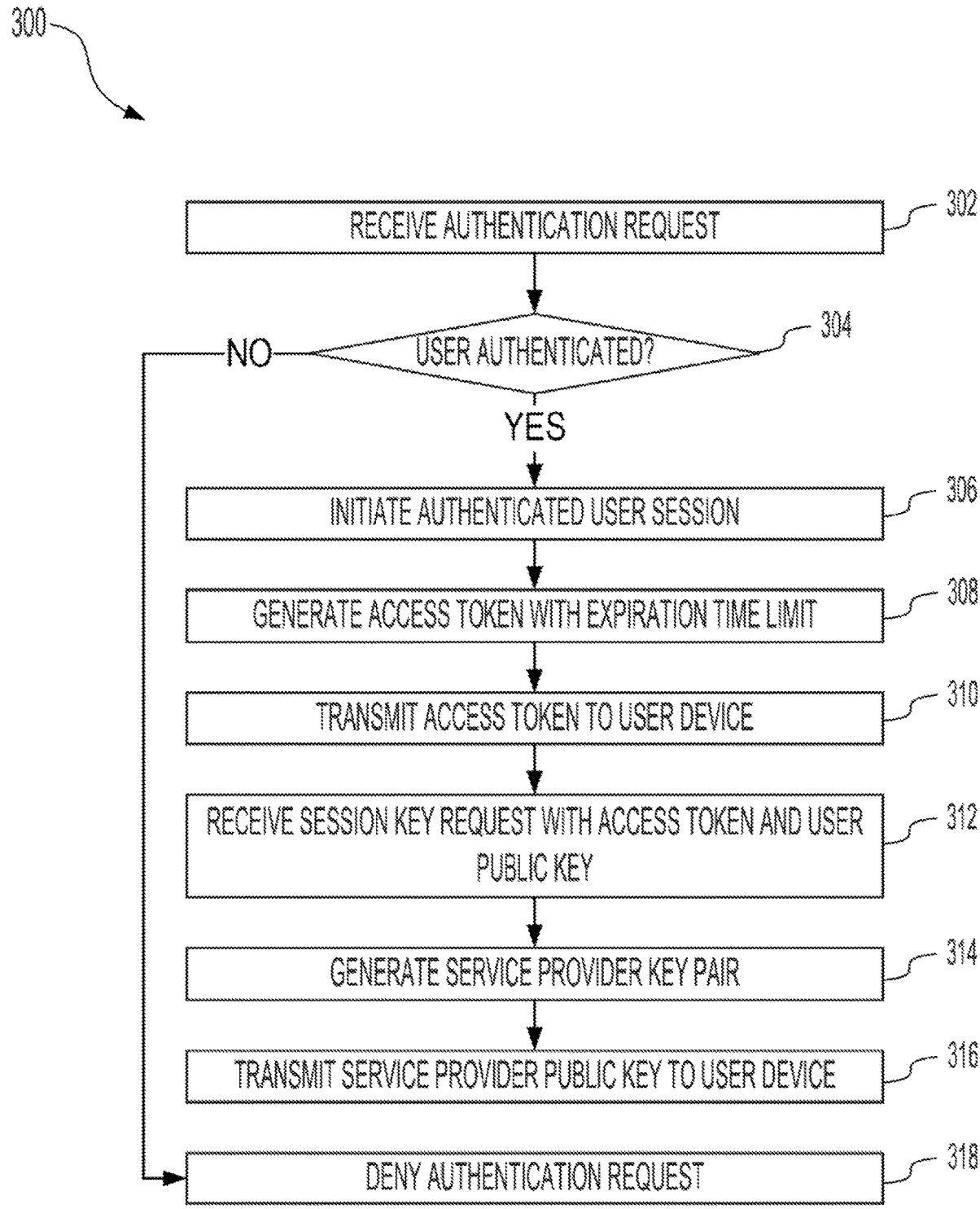
FIG. 3 shows an illustrative example of a process for generating and exchanging dynamic encryption keys associated with an access token having an associated expiration time issued for a user session during which a user uses a user application to interact with a service provider system in accordance with one or more embodiments described herein.

FIG. 3 shows an illustrative example of a process 300 for generating and exchanging dynamic encryption keys associated with an access token having an associated expiration time issued for a user session during which a user uses a user application to interact with a service provider system in accordance with one or more embodiments described herein. The process 300 may be performed, for example, by a service provider system, such as service provider system 106 described above at least in conjunction with FIG. 1A, FIG. 1B, and/or FIG. 2.

At step 302, an authentication request is received at a service provider system from a user device. In one or more embodiments, an authentication request includes any information which may be subjected to a verification process by the service provider system 106 in order to authenticate the user of the user application from which the authentication request is received. An authentication request may include an identifier associated with a user (e.g., username, email address, etc.) and some quantity of other information items that allow the service provider system to verify the identity of the user (i.e., authenticate the user). As an example, the service provider system may employ single factor authentication and require a username and password. As another example, the authentication request may include biometric information (e.g., facial scan, fingerprint, iris scan, etc.) of the user. An authentication request may include any number of discrete steps without departing from the scope of embodiments described herein. As an example, a user, via the user application, may provide a username and password as part of the authentication request to the service provider system. However, the service provider system may additionally check whether the user device on which the user application executes is recognized by the service provider system (e.g., the user has previously been authenticated when using the user application on the user device). When the user device is not recognized, the service provider system may require additional information to authenticate the user (e.g., multifactor authentication), such as providing a unique code provided to a separate device associated with the user (e.g., a user mobile device (not shown)).

At step 304, a determination is made as to whether the user associated with the authentication request received in Step 302 is authenticated. In one or more embodiments, the authentication is performed by an API gateway (e.g., the API gateway 108 shown in FIG. 1A, FIG. 1B, and FIG. 2 and described above) of the service provider system using one or more API calls to an authentication sub-system (e.g., the authentication sub-system 114 shown in FIG. 2 and described above) of the service provider system. In one or more embodiments, the authentication sub-system includes and/or has access to one or more data structures (not shown) that may be used to authenticate a user in response to an authentication request. As an example, an authentication request may include a username and passcode. The authentication sub-system 114 may include a data structure that includes usernames associated with a hash of a passcode corresponding to the username. The API gateway may make an API call to the authentication sub-system that includes the username and passcode, and the authentication sub-system performs a hash of the passcode. The result may then be compared with the hash in the data structure to determine if there is a match, which, if so, indicates the passcode is correct. Similar series of events may occur using information other than passcodes without departing from the scope of embodiments described herein. As an example, a different form of information may be provided as part of the authentication request API call from the API gateway to the authentication sub-system, such as biometric information (e.g., face scan information, fingerprint information, iris scan information, etc.), or information gained from a card swiped on or inserted into the user device by a user.

In one or more embodiments, the authenticating a user may require additional steps be performed to authenticate a user in response to an authentication request. As an example, the user may be required to perform two factor authentication, which may, for example, require that the user access a separate application on a separate mobile device of the user to interact with an interactive element within the application to further verify the identity of the user. As another example, the service provider system is configured to determine whether the user device from which the authentication request originated is a recognized device associated with the user. If the user device is not recognized, the user may be asked for a communication channel (e.g. email, text message) to which the service provider system may transmit a one-time code, which the user must obtain and enter in order to become authenticated. The authentication techniques described herein, and any other authentication techniques, may be used in any combination in order to authenticate a user of a user application. As an example, multi-factor authentication (e.g., password, then biometric information, then answering a pre-determined security question (e.g., "What street did you grow up on?")) and further verification of an unrecognized user device may be required for determining if a user is authenticated.

In one or more embodiments, if the user is not authenticated or the system is not able to authenticate the user, the process proceeds to step 318. In step 318, the authentication request is denied, and the denial is transmitted to the user device from which the authentication request was received. The denial may be accompanied by an invitation to the user to retry the authentication request. As an example, if the passcode could not be verified, the denial of the authentication request may include an indication that the passcode was incorrect, and invite the user to provide the correct passcode. In one or more embodiments, when the user is successfully authenticated, the process proceeds to step 306.

At step 306, based on the successful authentication of the user in step 304, an authenticated user session is initiated. In one or more embodiments, the authenticated user session is initiated by transmitting an indication of successful authentication to the user application from which the authentication request was received in step 302. In one or more embodiments, initiating an authenticated user session also includes receiving a request from the user application for an access token. For example, the indication of successful authentication may be provided to the user application along with a code, and the user application may use the code to request an access token.

At step 308, the service provider system generates an access token that includes or is otherwise associated with an expiration time (e.g., 1800 seconds). An access token may include any information to be used when the user application interacts with the service provider system. Examples of information included in an access token, may include, but are not limited to, an identifier of the user, an identifier of the user application, an identifier of a particular session (i.e., of the user using the user application), any privileges and/or permissions the user has for the service provider system (e.g., API calls to one or more service provider APIs that the user application is allowed to make), information about the access token (e.g., type of token, algorithm used to generate the token, etc.), and/or verification data to allow the user application to verify the source of the access token (i.e., the service provider system). As discussed above, the access token may also include an expiration time that determines the length of time for which the access token remains valid for accessing the service provider system and any APIs exposed therefrom. As an example, the access token may be a JavaScript Object Notation (JSON) Web Token (JWT) that includes a header with the type of token (i.e., JWT) and the algorithm used to create it, a payload with claims defining which resources of the service provider system may be accessed by the user application and setting an expiration time for the token, and a signature portion with information allowing the JWT to be securely validated. Any other type of access token may be generated by the service provider system without departing from the scope of embodiments described herein.

At step 310, the access token generated in step 308 is transmitted to the user application from which the authentication request was received in step 302. In one or more embodiments, the access token is stored by the user application (e.g., as part of the user application state) to be used when the user application interacts with the service provider system.

At step 312, a request for a service provider public key to be used during the user session is received by the service provider system from the user application. In one or more embodiments, before sending the request, the user application first generates a user public key and a user private key (e.g., a user public-private key pair). The encryption keys may be generated using any suitable method for generating encryption keys, such as, for example, the Rivest Shamir Adleman (RSA) algorithm, the digital signature algorithm (DSA), etc. Any other encryption key technique may be used without departing from the scope of embodiments described herein. The keys may be of any length (e.g., 2048 bits). In one or more embodiments, the user private key is stored by the user application (e.g., in user application state) to be used for decrypting information received from the service provider system (e.g., one or more fields or portions of an API call result returned to the user application in response to an API call, see FIG. 4). In one or more embodiments, the request for a service provider public key includes the access token and the user public key. In one or more embodiments, the service provider system receives the request, and verifies the access token (e.g., verifies that the access token includes permissions for the user application to make API calls to the service provider system, and is not expired or otherwise invalid). In one or more embodiments, the access token also identifies the particular user session for which the access token was issued. In one or more embodiments, when the verification of the access token is successful, the user public key is associated with the access token and, therefore, with the user session, and stored by the service provider system along with information corresponding to the access token, such that the user public key may be obtained when servicing API calls made using the access token.

At step 314, the service provider system generates a service provider private key and a service provider public key (i.e., a service provider public-private key pair). The encryption keys may be generated using any suitable method for generating encryption keys, such as, for example, the Rivest Shamir Adleman (RSA) algorithm, the digital signature algorithm (DSA), etc. Any other encryption key technique may be used without departing from the scope of embodiments described herein. The keys may be of any length (e.g., 512 bits). In one or more embodiments, the service provider private key is also stored by the service provider system associated with information corresponding to the access token, and is to be used for decrypting encrypted portions of API calls received, along with the access token, from the user application (see, e.g., the description of FIG. 4, below).

At step 316, the service provider system transmits the service provider public key to the user application, to be used for encrypting fields or portions of API calls made to the API gateway of the service provider system. The service provider public key may be stored by the user application (e.g., as part of the user application state).

Figure 4:
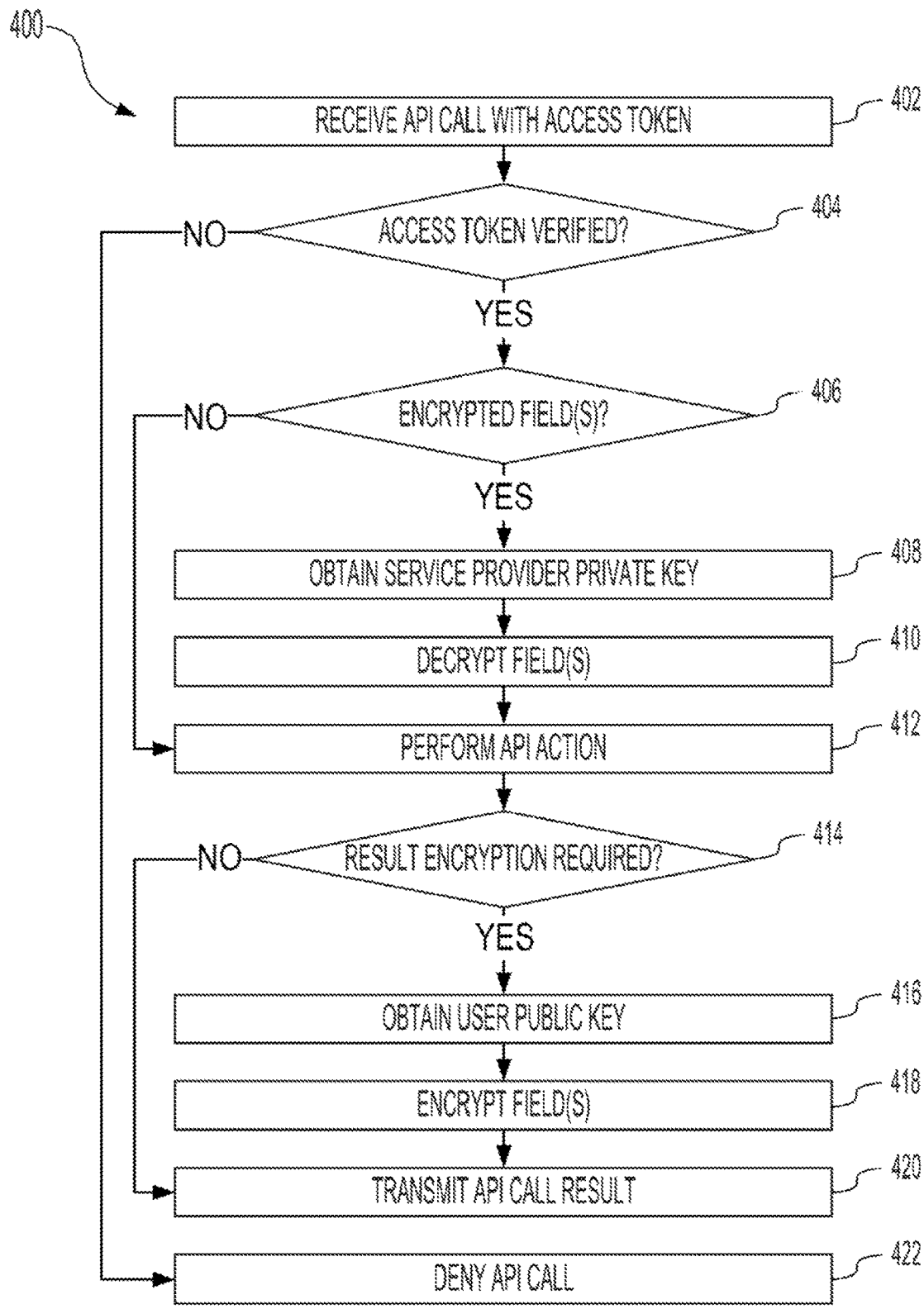
FIG. 4 shows an illustrative example of a process for servicing API calls that include one or more encrypted fields or portions in accordance with one or more embodiments described herein.

FIG. 4 shows an illustrative example of a process 400 for servicing API calls that include one or more encrypted fields or portions in accordance with one or more embodiments described herein. The process 400 may be performed, for example, by a service provider system, such as service provider system 106 described above at least in conjunction with FIG. 1A, FIG. 1B, and/or FIG. 2.

At step 402, an API call is received, along with an access token, from a user application at a service provider system. In one or more embodiments, an API call is a request made to an API for one or more actions to be performed. Such actions may include, but are not limited to, obtaining information (e.g., accessing account information for one or more accounts), updating information, deleting information, executing a method, process, function, etc. As an example, the service provider may be an entity that provides any number of user accounts for credit cards, bank accounts, etc., and API calls may be made by user application to the service provider system to perform actions such as accessing account information, updating account information, viewing account summaries and account details, viewing payment history, viewing account balances, making payments, filing disputes, etc.

At step 404, a determination is made as to whether the access token received with the API call is verified. In one or more embodiments, verifying the access token includes verifying that the access token is not expired or otherwise invalid, and verifying that the access token includes information indicating that the user application has appropriate permissions to make the API call. In one or more embodiments, if the access token is not verified (e.g., the access token is expired and/or indicates that the user application does not have permission to make the API call), the process proceeds to step 422. In one or more embodiments, if the access token is verified, the process proceeds to step 406.

At step 406, a determination is made as to whether the API call includes any encrypted fields or portions. The determination may be made using any technique for determining whether information is encrypted. As an example, the service provider system may be configured to recognize the API call and obtain information indicating which, if any, of the fields or portions therein required encryption by the user application. As another example, the service provider system may be configured to assess the various fields or portions of the API call to determine if they are encrypted. In one or more embodiments, if the API call does not include one or more encrypted fields, the process proceeds to step 412. In one or more embodiments, if the API call includes one or more encrypted fields, the process proceeds to step 408.

At step 408, the service provider system obtains the service provider private key. In one or more embodiments, the service provider private key is obtained based on the access token received with the API call. In one or more embodiments, the service provider private key is obtained from a key storage, such as the key storage 120 shown in FIG. 2 and described above.

At step 410, the service provider private key is used to decrypt the one or more encrypted fields or portions of the API call. In one or more embodiments, decrypting the fields or portions of the API call results in the service provider system obtaining a decrypted API call At step 412, the decrypted API call is used to perform an API action requested by the API call. The API action may be performed using service provider resource(s) of the service provider system. The service provider resources may include any resources of the service provider system that may be used to service an API call. As an example, the service provider resources may include storage that includes any number of data structures of any type that store information related to one or more user accounts of the user of the user application. The API call may be requesting an API action to retrieve such information, update the information, delete the information, add additional information, etc. In one or more embodiments, the service provider system performs the API action requested by the decrypted API call using the service provider resource(s) to obtain an API call result. As an example, if the API call was a request for information (e.g., a user account balance), the API call result may include the requested information. As another example, if the API call was a request to update information (e.g., update an annual income associated with the user account), the API call result may include a confirmation that the information was successfully updated. As another example, if the API call was a request that a certain action be performed (e.g., dispute a transaction), then the API call result may include a confirmation that the action was performed.

At step 414, a determination is made as to whether the API call result includes any fields or portions that require encryption. In one or more embodiments, an API call result may include one or more fields or portions in which information is to be provided to the user application. The information to be provided in any number of such fields may be deemed sensitive. As an example, the service provider may deem certain fields as sensitive data, such as an account identifier, personally identifiable information (e.g., name, date of birth, email address, phone number, Internet Protocol (IP address), passport number, account number(s) all or any portion of a social security number, etc.), information subject to the Payment Card Industry Data Security Standard (PCI DSS), protected health information (PHI), etc. In one or more embodiments, when an API call result includes one or more fields or portions deemed sensitive, such fields or portions may be required to be encrypted before transmitting the API call result to the user application, so that the information if the one or more fields or portions of the API call result are not exposed. Therefore, one or more fields or portions of an API call result may be designated as requiring encryption. Such a designation may be made in any manner identifiable by the service provider system. As an example, a given field or portion of an API call result may be associated with a character string (e.g., "cipher") that designates the field or portion as having been deemed sensitive, and requiring encryption. In such an example, a field for the last four digits of a social security number field may be so designated with "cipher.SS_num", which indicates that the social security field should be encrypted. In one or more embodiments, if the API call result does not include any fields or portions designated for encryption, the process proceeds to step 420. In one or more embodiments, if the API call result includes one or more fields or portions designated for encryption, the process proceeds to step 416.

At step 416, based on the determination in step 414 that at least one field of the API call result should be encrypted, the service provider system obtains the user public key. The user public key may be obtained by the service provider system based on the access token received with the API call. In one or more embodiments, the user public key is obtained from a key storage, such as the key storage 120 shown in FIG. 2 and described above.

At step 418, the user public key obtained in step 416 is used to encrypt the one or more fields of the API call result. In one or more embodiments, encrypting the one or more fields includes using the user public key and the plain text of the field pursuant to the relevant encryption algorithm to encrypt the field.

At step 420, the API call result with one or more encrypted fields or portions is transmitted to the user application that made the API call. In one or more embodiments, when the user application receives the API call result, the user application first determines whether the API call result includes any encrypted fields or portions. In one or more embodiments, when the API call result includes encrypted fields or portions, the user application obtains the user private key and decrypts the encrypted fields or portions to obtain a decrypted API call result. As an example, the API call result may include an account summary requested by the API call, which has several encrypted fields. In such a scenario, the user application uses the user private key to decrypt the encrypted fields before displaying the account summary to the user via a user interface.

At step 422, based on a determination in step 404 that the access token is not verified, the service provider system transmits a denial of the API call to the user application. The denial of the API call may include an indication that the API call was denied due to an invalid access token. The user application may, in response to the denial, request an updated access token, which may be used to initiate an exchange of updated encryption keys, which may be used to re-attempt the API call.

Figure 5:
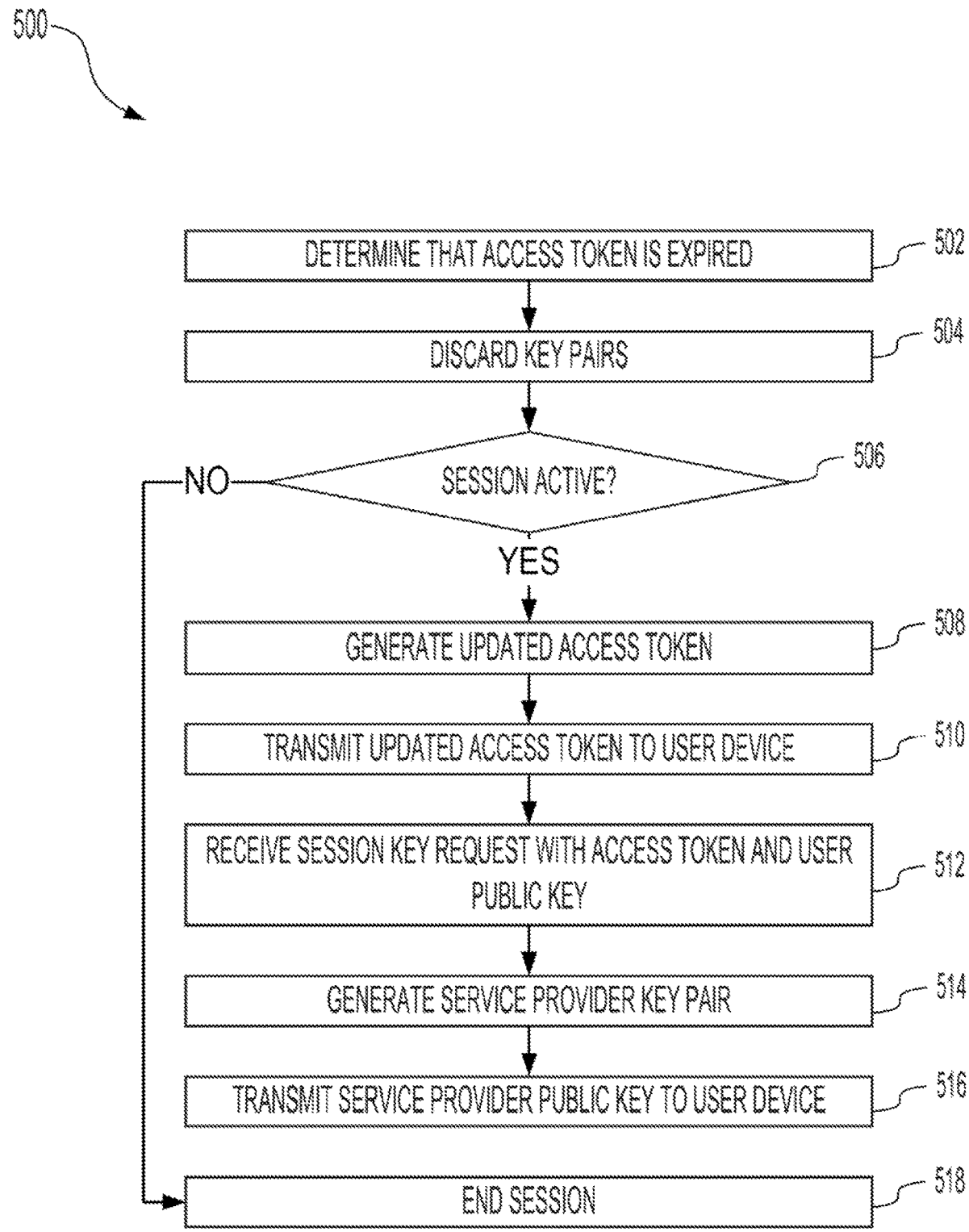
FIG. 5 shows an illustrative example of a process for dynamically generating and exchanging updated encryption keys between a service provider system and a user device when an access token becomes invalid or expired in accordance with one or more embodiments described herein.

FIG. 5 shows an illustrative example of a process 500 for dynamically generating and exchanging updated encryption keys between a service provider system and a user device when an access token becomes invalid or expired in accordance with one or more embodiments described herein. The process 500 may be performed, for example, by a service provider system, such as service provider system 106 described above at least in conjunction with FIG. 1A, FIG. 1B and/or FIG. 2.

At step 502, a determination is made that an access token previously issued to a user application for a user session is expired (e.g., the expiration time of the access token has been exceeded) or otherwise invalid (e.g., the user logged out, been inactive, etc.). In one or more embodiments, the determination is made by the service provider system upon receipt of the access token (e.g., as part of an attempted API call from a user application). As an example, the service provider system may receive an API call with an access token having an associated expiration time. The service provider system may use the expiration time compared with the time at which the access token was issued to determine that the access token is expired. As another example, the service provider system may determine that the user has logged out of the user application, or remained inactive for more than a pre-defined inactivity threshold, thereby rendering the access token invalid, as the user session for which the access token was issued is no longer valid. In one or more embodiments, a determination that the access token is expired is made by the user application to which the access token was issued. As an example, the user application may assess the expiration time of the access token relative to the time the token was issued prior to using the access token to make an API call. Both the service provider system and the user application may be configured to determine if an access token is expired or otherwise invalid without departing from the scope of embodiments described herein.

At step 504, the service provider and user key pairs are discarded or otherwise no longer used during the servicing of API calls from the user application to the service provider system. In one or more embodiments, when an access token for a user session expires, the associated dynamic encryption keys (i.e., the service provider public key, the service provider private key, the user public key, and the user private key) are discarded from the service provider system and the user application. In one or more embodiments, if the user session ends (e.g., via logout or inactivity), the access token is no longer valid, and the associated dynamic encryption keys are discarded from the service provider system and the user application.

At step 506, a determination is made as to whether the user session remains active. A user session may remain active when a user continues to interact with the user application, and an inactivity threshold has not been met. In one or more embodiments, if the session is no longer active, the process proceeds to step 518, and the session ends. In one or more embodiments, if the user session remains active, the process proceeds to step 508

At step 508, the service provider system generates an access token that includes or is otherwise associated with an expiration time (e.g., 1800 seconds). An access token may include any information to be used when the user application interacts with the service provider system. Examples of information included in an access token, may include, but are not limited to, an identifier of the user, an identifier of the user application, an identifier of a particular session (i.e., of the user using the user application), any privileges and/or permissions the user has for the service provider system (e.g., API calls to one or more service provider APIs that the user application is allowed to make), information about the access token (e.g., type of token, algorithm used to generate the token, etc.), and/or verification data to allow the user application to verify the source of the access token (i.e., the service provider system). As discussed above, the access token may also include an expiration time that determines the length of time for which the access token remains valid for accessing the service provider system and any APIs exposed therefrom. As an example, the access token may be a JavaScript Object Notation (JSON) Web Token (JWT) that includes a header with the type of token (i.e., JWT) and the algorithm used to create it, a payload with claims defining which resources of the service provider system may be accessed by the user application and setting an expiration time for the token, and a signature portion with information allowing the JWT to be securely validated. Any other type of access token may be generated by the service provider system without departing from the scope of embodiments described herein.

In one or more embodiments, the updated access token is generated by the service provider system when the service provider system determines that the previously issued access token is expired or otherwise invalid, and the user session remains active. In one or more embodiments, the service provider system generates the updated access token based on a request for an updated access token from the user application. As an example, the user application may attempt to make an API call to the service provider system using an expired token. The service provider may respond with a denial of the API call and an indication that the denial was due to an expired access token. The user application may respond to the denial and indication by requesting an updated access token. Before generating an updated access token, the service provider system may or may not require that the user be re-authenticated (see, e.g., the description of FIG. 3, above).

At step 510, the access token generated in step 508 is transmitted to the user application. In one or more embodiments, the access token is stored by the user application (e.g., as part of the user application state) to be used when the user application interacts with the service provider system.

At step 512, a request for a service provider public key to be used during the user session is received by the service provider system from the user application. In one or more embodiments, before sending the request, the user application first generates a user public key and a user private key (e.g., a user public-private key pair). The encryption keys may be generated using any suitable method for generating encryption keys, such as, for example, the Rivest Shamir Adleman (RSA) algorithm, the digital signature algorithm (DSA), etc. Any other encryption key technique may be used without departing from the scope of embodiments described herein. The keys may be of any length (e.g., 2048 bits). In one or more embodiments, the user private key is stored by the user application (e.g., in user application state) to be used for decrypting information received from the service provider system (e.g., one or more fields or portions of an API call result returned to the user application in response to an API call, see FIG. 4). In one or more embodiments, the request for a service provider public key includes the access token and the user public key. In one or more embodiments, the service provider system receives the request, and verifies the access token (e.g., verifies that the access token includes permissions for the user application to make API calls to the service provider system, and is not expired or otherwise invalid). In one or more embodiments, the access token also identifies the particular user session for which the access token was issued. In one or more embodiments, when the verification of the access token is successful, the user public key is associated with the access token and, therefore, with the user session, and stored by the service provider system along with information corresponding to the access token, such that the user public key may be obtained when servicing API calls made using the access token.

At step 514, the service provider system generates a service provider private key and a service provider public key (i.e., a service provider public-private key pair). The encryption keys may be generated using any suitable method for generating encryption keys, such as, for example, the Rivest Shamir Adleman (RSA) algorithm, the digital signature algorithm (DSA), etc. Any other encryption key technique may be used without departing from the scope of embodiments described herein. The keys may be of any length (e.g., 3072 bits). In one or more embodiments, the service provider private key is also stored by the service provider system associated with information corresponding to the access token, and is to be used for decrypting encrypted portions of API calls received, along with the access token, from the user application (see, e.g., the description of FIG. 4, above).

At step 516, the service provider system transmits the service provider public key to the user application, to be used for encrypting fields or portions of API calls made to the API gateway of the service provider system. The service provider public key may be stored by the user application (e.g., as part of the user application state).

Any such steps or operations of the blocks illustrating steps described above can be implemented in a special purpose computing device that is specially configured for operations or methods described herein. Such special purpose computers can be specially configured for the specific algorithms described above, portions of such algorithms, or for any aspects of the methods described herein. In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). Such analysis can, for example, include analysis and authentication operations as described above (e.g., steps 302, 304), security token verification (e.g., step 404), generation of tokens and/or key pairs (e.g., steps 308, 314, 508, or 514), description and encryption (e.g., step 410 and step 418), or any other such operations that can be enhanced or implemented using machine learning algorithms.

In various aspects, sets of data from the illustrated steps, blocks, or operations can involve generating data that can be selected for training of the machine learning model to facilitate identification of correlations between members of the set of data and improvement of the described operations. The machine learning model may, for example, use the data to determine whether the machine learning system is performing the described operations, with feedback to improve operations based on desired correlations. The machine learning model may further be dynamically trained by soliciting feedback from users of a system as to the efficacy of correlations provided by the machine learning algorithm or artificial intelligence algorithm (e.g., the supervision). The machine learning algorithm or artificial intelligence may use this feedback in real-time (e.g., while a system is performing operations to generate data in accordance with any method, step, or operation described herein) or in scheduled updates or training sessions to improve the algorithm for generating correlations (e.g., the feedback may be used to further train the machine learning algorithm or artificial intelligence to provide more accurate correlations).

Figure 6:
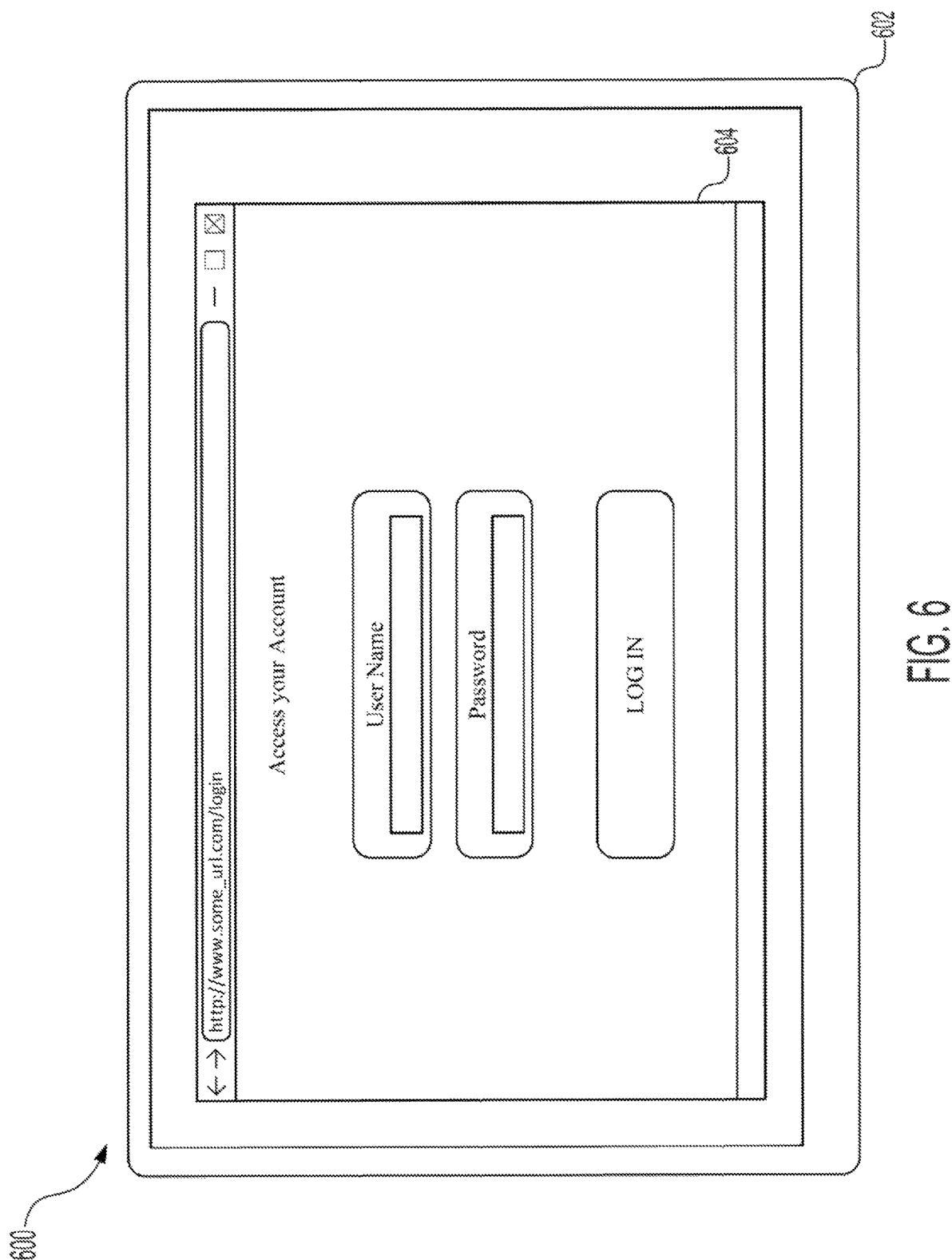
FIG. 6 shows an illustrative example of a user application executing on a user device displaying a page by which a user may initiate a user authentication process in accordance with one or more embodiments described herein.

FIG. 6 shows an illustrative example of an environment 600 in which a user application 604 executing on a user device 602 configured to interact with a service provider system (not shown) to authenticate a user to initiate a user session in which the user application will use an access token with an associated expiration time, and dynamic encryption key pairs associated with the access token, to make API calls to the service provider system in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in this particular example. This example is intended to be a simple example to illustrate, at least in part, concepts described herein.

Referring to FIG. 6, consider a scenario in which a user uses a mobile computing device (i.e., user device 602) to access a single page application (SPA) (i.e., user application 604) to access a credit account that the user has with a financial services provider. In such a scenario, in order to access the service provider system, and any APIs exposed therefrom, the user is first authenticated. In the example shown in FIG. 6, the authentication process begins by the user application 604 requesting that the user enter a username and password, and press the Log In button.

In one or more embodiments, once the user enters the username and password, and hits the Log In button (i.e., makes an authentication request), the authentication request is transmitted to the service provider system. The service provider system makes an API call to an authentication sub-system (not shown) to determine if the user may be authenticated using the provided username and password. The authentication sub-system uses the username and a hash of the password to determine if a matching hash is associated with the username in a data structure accessible by the authorization sub-system. In this scenario, the password is correct, and the user device 602 is recognized. Therefore, the user may be authenticated. Next, the service provider system sends an HTTPS 302 response to the user device 602, along with a code, which re-directs the user device to request an access token using the code. In response to the request for an access token, a JWT is issued to the user application, which includes an expiration time of 3600 seconds and a set of permissions regarding API calls that the user application may make to the service provider system.

Once the user application 604 has the access token, the user application 604 generates an RSA key pair that includes a user private key and a user public key. The user application then sends a request for a service provider public key, along with the access token and the user public key, to the service provider. In response, the service provider verifies the access token and generates a service provider RSA key pair including a service provider public key and a service provider private key. The user public key and the service provider private key are stored by the service provider with an association with the access token issued to the user application, and the service provider public key is transmitted to the user application, where it is stored in user application state (e.g., a browser cache).

Figure 7:
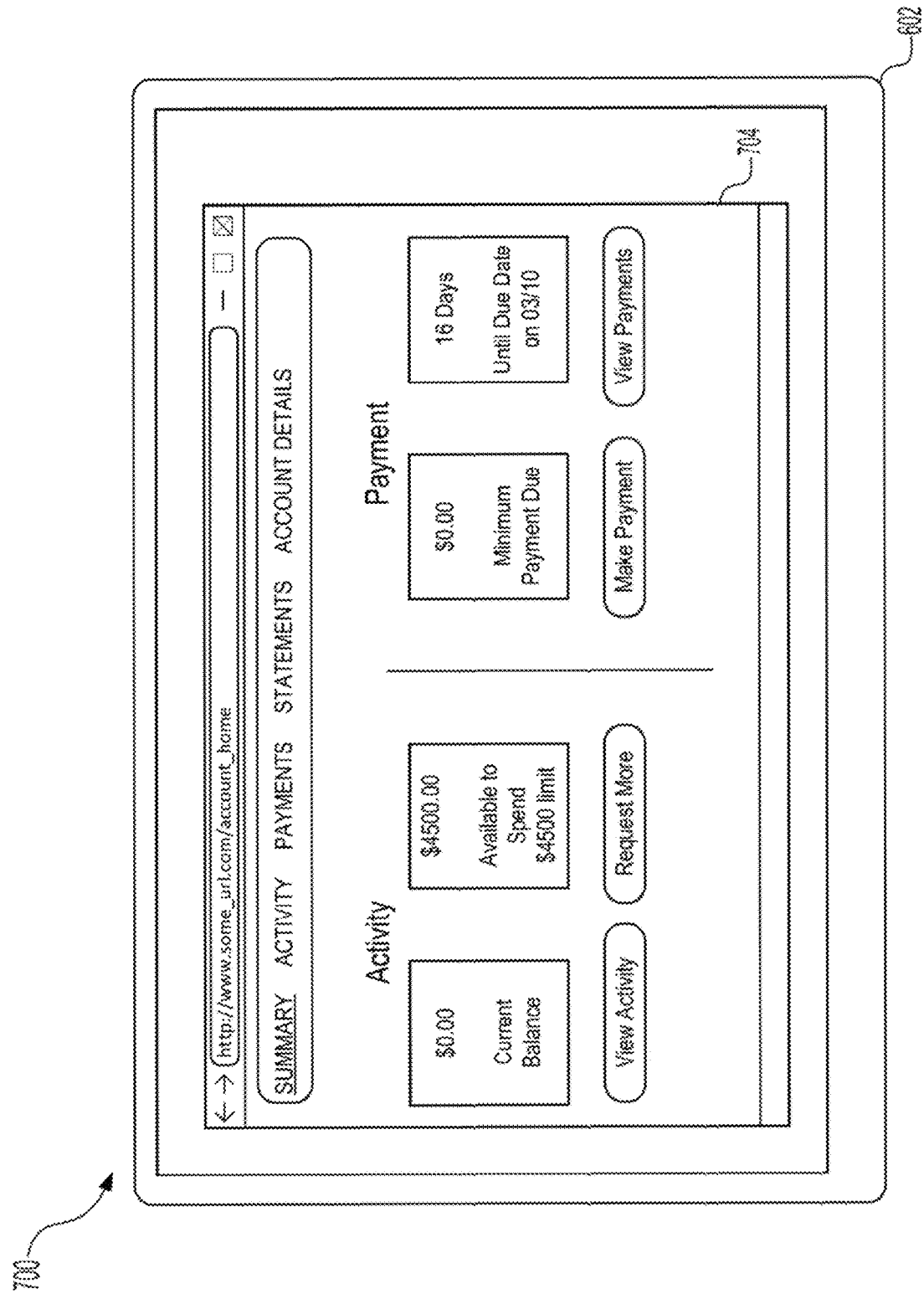
FIG. 7 shows an illustrative example of a landing page of a user application displaying account summary information obtained using an encrypted API call and an access token in accordance with one or more embodiments described herein.

Next, the user application will display a landing page to the user. FIG. 7 shows an example environment 700 of a landing page 704 of the user application. In this scenario, the user has previously selected to have an account summary as the landing page after logging in to the user application. Therefore, the user application makes an API call to the service provider system to obtain the account summary information to be displayed to the user.

To make the API call, the user application first determines that the API call for account summary information requires an account identifier, which is deemed to be sensitive information, and thus requires encryption. The determination is made because the account identifier field of the API call is designated with "cipher.accountId", which may appear in the API call as follows: GET /v1credit/accounts/search?cipher.accountId=encrypted_identifier Based on the aforementioned determination, the user application uses the service provider public key to encrypt the account identifier, and transmits the API call and the access token to the service provider system. Upon receipt of the API call, the service provider system first verifies that the access token is not expired, and that the access token indicates that the user application has permission to make the API call. In this scenario, the verification succeeds. Therefore, the service provider system determines that the API call includes an encrypted field, and obtains the service provider private key associated with the access token to decrypt the encrypted field and obtain a decrypted API call.

The decrypted API call is then used to perform an API action of accessing appropriate data structures in the service provider resources to obtain the account summary information.

Next, the service provider system determines that the account summary information (i.e., the API result obtained by using the decrypted API call to perform the API action) includes several fields that are designated as requiring encryption. Therefore, the service provider system obtains the user public key associated with the access token and encrypts the designated fields to obtain an encrypted API call result. The encrypted API call result is transmitted to the user application. The user application uses the user private key to decrypt the encrypted fields, and then displays the account summary information to the user, as shown in FIG. 7.

In this scenario, the user continues to use the user application to view various items of information associated with the user's account. The user may use the bar near the top of the user application user interface, or any interactive element therein, to request additional items of information to be displayed. Each such request is performed by the user application making another API call using the technique described above, and the service provider system servicing the API call.

3660 seconds after the user application was issued the access token, the user clicks on "SUMMARY" to go back to the account summary information. The user application thus makes and API call using the access token. However, the service provider system determines that the time since the access token was issued (i.e., 3660 seconds) is greater than the expiration time (3600 seconds) of the access token. Therefore, the service provider system denies the API call, and sends an indication to the user application of the denial based on an expired access token.

In response to the denial, the user application requests an updated access token, which is generated by the service provider system, given an expiration time of 3600 seconds, and transmitted to the user application. The service provider system discards the service provider key pair, and the user public key. The user application discards the user key pair and the service provider public key. The user application then generates an updated user public key and user private key. The user application then uses the updated access token and updated user public key to request an updated service provider public key. The service provider system verifies the updated access token, generates an updated service provider public key and service provider private key, stores the user public key and service provider private key associated with the access token, and transmits the service provider public key to the user application. The user application then uses the updated access token and the service provider public key to re-try the API call requesting account summary information, as described above.

In the above-described scenario, the encryption keys used to encrypt fields of the API calls and the API call results are made dynamic by only allowing the keys to be used while the access token for the user session is not expired or otherwise invalid. In one or more embodiments, using dynamic encryption keys that only remain valid and usable during the time when an associated access token for a given user session is valid and/or has not expired reduces the risk that the keys stored by the user application and/or the service provider may be compromised, eliminates the need to store the encryption keys for periods of time longer than a given user session, and eliminates any overhead that may be associated with implementing a key rotation scheme.

FIG. 8 illustrates a computing system architecture 800, including various components in electrical communication with each other, in accordance with some embodiments. The example computing system architecture 800 illustrated in FIG. 8 includes a computing device 802, which has various components in electrical communication with each other using a connection 806, such as a bus, in accordance with some implementations. The example computing system architecture 800 includes a processor 804 (e.g., a processing unit) that is in electrical communication with various system components, using the connection 806, and including the system memory 814. In some embodiments, the system memory 814 includes read-only memory (ROM), random-access memory (RAM), and other such memory technologies including, but not limited to, those described herein. In some embodiments, the example computing system architecture 800 includes a cache 808 of high-speed memory connected directly with, in close proximity to, or integrated as part of the processor 804. The system architecture 800 can copy data from the memory 814 and/or the storage device 810 to the cache 808 for quick access by the processor 804. In this way, the cache 808 can provide a performance boost that decreases or eliminates processor delays in the processor 804 due to waiting for data. Using modules, methods and services such as those described herein, the processor 804 can be configured to perform various actions. In some embodiments, the cache 808 may include multiple types of cache including, for example, level one (L1) and level two (L2) cache. The memory 814 may be referred to herein as system memory or computer system memory. The memory 814 may include, at various times, elements of an operating system, one or more applications, data associated with the operating system or the one or more applications, or other such data associated with the computing device 802.

Other system memory 814 can be available for use as well. The memory 814 can include multiple different types of memory with different performance characteristics. The processor 804 can include any general purpose processor and one or more hardware or software services, such as service 812 stored in storage device 810, configured to control the processor 804 as well as a special-purpose processor where software instructions are incorporated into the actual processor design. The processor 804 can be a completely self-contained computing system, containing multiple cores or processors, connectors (e.g., buses), memory, memory controllers, caches, etc. In some embodiments, such a self-contained computing system with multiple cores is symmetric. In some embodiments, such a self-contained computing system with multiple cores is asymmetric. In some embodiments, the processor 804 can be a microprocessor, a microcontroller, a digital signal processor ("DSP"), or a combination of these and/or other types of processors. In some embodiments, the processor 804 can include multiple elements such as a core, one or more registers, and one or more processing units such as an arithmetic logic unit (ALU), a floating point unit (FPU), a graphics processing unit (GPU), a physics processing unit (PPU), a digital system processing (DSP) unit, or combinations of these and/or other such processing units.

To enable user interaction with the computing system architecture 800, an input device 816 can represent any number of input mechanisms, such as a microphone for speech, a touch-sensitive screen for gesture or graphical input, keyboard, mouse, motion input, pen, and other such input devices. An output device 818 can also be one or more of a number of output mechanisms known to those of skill in the art including, but not limited to, monitors, speakers, printers, haptic devices, and other such output devices. In some instances, multimodal systems can enable a user to provide multiple types of input to communicate with the computing system architecture 800. In some embodiments, the input device 816 and/or the output device 818 can be coupled to the computing device 802 using a remote connection device such as, for example, a communication interface such as the network interface 820 described herein. In such embodiments, the communication interface can govern and manage the input and output received from the attached input device 816 and/or output device 818. As may be contemplated, there is no restriction on operating on any particular hardware arrangement and accordingly the basic features here may be substituted for other hardware, software, or firmware arrangements as they are developed.

In some embodiments, the storage device 810 can be described as non-volatile storage or non-volatile memory. Such non-volatile memory or non-volatile storage can be a hard disk or other types of computer readable media which can store data that are accessible by a computer, such as magnetic cassettes, flash memory cards, solid state memory devices, digital versatile disks, cartridges, RAM, ROM, and hybrids thereof.

As described herein, the storage device 810 can include hardware and/or software services such as service 812 that can control or configure the processor 804 to perform one or more functions including, but not limited to, the methods, processes, functions, systems, and services described herein in various embodiments. In some embodiments, the hardware or software services can be implemented as modules. As illustrated in example computing system architecture 800, the storage device 810 can be connected to other parts of the computing device 802 using the system connection 806. In an embodiment, a hardware service or hardware module such as service 812, that performs a function can include a software component stored in a non-transitory computer-readable medium that, in connection with the necessary hardware components, such as the processor 804, connection 806, cache 808, storage device 810, memory 814, input device 816, output device 818, and so forth, can carry out the functions such as those described herein.

The disclosed gifting service system and the associated systems and methods for providing a consumer with an option to send a gift received as the result of a purchase from a retailer to a separate recipient may be performed using a computing system such as the example computing system illustrated in FIG. 8, using one or more components of the example computing system architecture 800. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device.

In some embodiments, the processor can be configured to carry out some or all of methods and systems described herein by, for example, executing code using a processor such as processor 804 wherein the code is stored in memory such as memory 814 as described herein. One or more of a user device, a provider server or system, a database system, or other such devices, services, or systems may include some or all of the components of the computing system such as the example computing system illustrated in FIG. 8, using one or more components of the example computing system architecture 800 illustrated herein. As may be contemplated, variations on such systems can be considered as within the scope of the present disclosure.

This disclosure contemplates the computer system taking any suitable physical form. As example and not by way of limitation, the computer system can be an embedded computer system, a system-on-chip (SOC), a single-board computer system (SBC) (such as, for example, a computer-on-module (COM) or system-on-module (SOM)), a desktop computer system, a laptop or notebook computer system, a tablet computer system, a wearable computer system or interface, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud computing system which may include one or more cloud components in one or more networks as described herein in association with the computing resources provider 828. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor 804 can be a conventional microprocessor such as an Intel® microprocessor, an AMD® microprocessor, a Motorola® microprocessor, or other such microprocessors. One of skill in the relevant art will recognize that the terms "machine-readable (storage) medium" or "computer-readable (storage) medium" include any type of device that is accessible by the processor.

The memory 814 can be coupled to the processor 804 by, for example, a connector such as connector 806, or a bus. As used herein, a connector or bus such as connector 806 is a communications system that transfers data between components within the computing device 802 and may, in some embodiments, be used to transfer data between computing devices. The connector 806 can be a data bus, a memory bus, a system bus, or other such data transfer mechanism. Examples of such connectors include, but are not limited to, an industry standard architecture (ISA" bus, an extended ISA (EISA) bus, a parallel AT attachment (PATA" bus (e.g., an integrated drive electronics (IDE) or an extended IDE (EIDE) bus), or the various types of parallel component interconnect (PCI) buses (e.g., PCI, PCIe, PCI-104, etc.).

The memory 814 can include RAM including, but not limited to, dynamic RAM (DRAM), static RAM (SRAM), synchronous dynamic RAM (SDRAM), non-volatile random access memory (NVRAM), and other types of RAM. The DRAM may include error-correcting code (EEC). The memory can also include ROM including, but not limited to, programmable ROM (PROM), erasable and programmable ROM (EPROM), electronically erasable and programmable ROM (EEPROM), Flash Memory, masked ROM (MROM), and other types or ROM. The memory 814 can also include magnetic or optical data storage media including read-only (e.g., CD ROM and DVD ROM) or otherwise (e.g., CD or DVD). The memory can be local, remote, or distributed.

As described herein, the connector 806 (or bus) can also couple the processor 804 to the storage device 810, which may include non-volatile memory or storage and which may also include a drive unit. In some embodiments, the non-volatile memory or storage is a magnetic floppy or hard disk, a magnetic-optical disk, an optical disk, a ROM (e.g., a CD-ROM, DVD-ROM, EPROM, or EEPROM), a magnetic or optical card, or another form of storage for data. In various aspects, some of this data is written by a direct memory access process into memory during execution of software in a computer system. The non-volatile memory or storage can be local, remote, or distributed. In some embodiments, the non-volatile memory or storage is optional. As may be contemplated, a computing system can be created with all applicable data available in memory. A typical computer system will usually include at least one processor, memory, and a device (e.g., a bus) coupling the memory to the processor.

Software and/or data associated with software can be stored in the non-volatile memory and/or the drive unit. In some embodiments (e.g., for large programs) it may not be possible to store the entire program and/or data in the memory at any one time. In such embodiments, the program and/or data can be moved in and out of memory from, for example, an additional storage device such as storage device 810. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The connection 806 can also couple the processor 804 to a network interface device such as the network interface 820. The interface can include one or more of a modem, network interface card (NIC), or other such network interfaces including, but not limited to those described herein. It will be appreciated that the network interface 820 may be considered to be part of the computing device 802 or may be separate from the computing device 802. The network interface 820 can include one or more of an analog modem, Integrated Services Digital Network (ISDN) modem, cable modem, token ring interface, satellite transmission interface, or other interfaces for coupling a computer system to other computer systems. In some embodiments, the network interface 820 can include one or more input and/or output (I/O) devices. The I/O devices can include, by way of example but not limitation, input devices such as input device 816 and/or output devices such as output device 818. For example, the network interface 820 may include a keyboard, a mouse, a printer, a scanner, a display device, and other such components. Other examples of input devices and output devices are described herein. In some embodiments, a communication interface device can be implemented as a complete and separate computing device.

In operation, the computer system can be controlled by operating system software that includes a file management system, such as a disk operating system. One example of operating system software with associated file management system software is the family of Windows® operating systems and their associated file management systems. Another example of operating system software with its associated file management system software is the Linux™ operating system and its associated file management system including, but not limited to, the various types and implementations of the Linux® operating system and their associated file management systems. The file management system can be stored in the non-volatile memory and/or drive unit and can cause the processor to execute the various acts required by the operating system to input and output data and to store data in the memory, including storing files on the non-volatile memory and/or drive unit. As may be contemplated, other types of operating systems such as, for example, MacOS®, other types of UNIX® operating systems (e.g., BSD™ and descendants, Xenix™ SunOS™, HP-UX®, etc.), mobile operating systems (e.g., iOS® and variants, Chrome®, Ubuntu Touch®, watchOS®, Windows 10 Mobile®, the Blackberry® OS, etc.), and real-time operating systems (e.g., VxWorks®, QNX®, eCos®, RTLinux®, etc.) may be considered as within the scope of the present disclosure. As may be contemplated, the names of operating systems, mobile operating systems, real-time operating systems, languages, and devices, listed herein may be registered trademarks, service marks, or designs of various associated entities.

In some embodiments, the computing device 802 can be connected to one or more additional computing devices such as computing device 824 via a network 822 using a connection such as the network interface 820. In such embodiments, the computing device 824 may execute one or more services 826 to perform one or more functions under the control of, or on behalf of, programs and/or services operating on computing device 802. In some embodiments, a computing device such as computing device 824 may include one or more of the types of components as described in connection with computing device 802 including, but not limited to, a processor such as processor 804, a connection such as connection 806, a cache such as cache 808, a storage device such as storage device 810, memory such as memory 814, an input device such as input device 816, and an output device such as output device 818. In such embodiments, the computing device 824 can carry out the functions such as those described herein in connection with computing device 802. In some embodiments, the computing device 802 can be connected to a plurality of computing devices such as computing device 824, each of which may also be connected to a plurality of computing devices such as computing device 824. Such an embodiment may be referred to herein as a distributed computing environment.

The network 822 can be any network including an internet, an intranet, an extranet, a cellular network, a Wi-Fi network, a local area network (LAN), a wide area network (WAN), a satellite network, a Bluetooth® network, a virtual private network (VPN), a public switched telephone network, an infrared (IR) network, an internet of things (IoT network) or any other such network or combination of networks. Communications via the network 822 can be wired connections, wireless connections, or combinations thereof. Communications via the network 822 can be made via a variety of communications protocols including, but not limited to, Transmission Control Protocol/Internet Protocol (TCP/IP), User Datagram Protocol (UDP), protocols in various layers of the Open System Interconnection (OSI) model, File Transfer Protocol (FTP), Universal Plug and Play (UPnP), Network File System (NFS), Server Message Block (SMB), Common Internet File System (CIFS), and other such communications protocols.

Communications over the network 822, within the computing device 802, within the computing device 824, or within the computing resources provider 828 can include information, which also may be referred to herein as content. The information may include text, graphics, audio, video, haptics, and/or any other information that can be provided to a user of the computing device such as the computing device 802. In an embodiment, the information can be delivered using a transfer protocol such as Hypertext Markup Language (HTML), Extensible Markup Language (XML), JavaScript®, Cascading Style Sheets (CSS), JavaScript® Object Notation (JSON), and other such protocols and/or structured languages. The information may first be processed by the computing device 802 and presented to a user of the computing device 802 using forms that are perceptible via sight, sound, smell, taste, touch, or other such mechanisms. In some embodiments, communications over the network 822 can be received and/or processed by a computing device configured as a server. Such communications can be sent and received using PUP: Hypertext Preprocessor ("PHP"), Python™, Ruby, Perl® and variants, Java®, HTML, XML, or another such server-side processing language.

In some embodiments, the computing device 802 and/or the computing device 824 can be connected to a computing resources provider 828 via the network 822 using a network interface such as those described herein (e.g. network interface 820). In such embodiments, one or more systems (e.g., service 830 and service 832) hosted within the computing resources provider 828 (also referred to herein as within "a computing resources provider environment") may execute one or more services to perform one or more functions under the control of, or on behalf of, programs and/or services operating on computing device 802 and/or computing device 824. Systems such as service 830 and service 832 may include one or more computing devices such as those described herein to execute computer code to perform the one or more functions under the control of, or on behalf of, programs and/or services operating on computing device 802 and/or computing device 824.

For example, the computing resources provider 828 may provide a service, operating on service 830 to store data for the computing device 802 when, for example, the amount of data that the computing device 802 attempts to store exceeds the capacity of storage device 810. In another example, the computing resources provider 828 may provide a service to first instantiate a virtual machine (VM) on service 832, use that VM to access the data stored on service 832, perform one or more operations on that data, and provide a result of those one or more operations to the computing device 802. Such operations (e.g., data storage and VM instantiation) may be referred to herein as operating "in the cloud," "within a cloud computing environment," or "within a hosted virtual machine environment," and the computing resources provider 828 may also be referred to herein as "the cloud." Examples of such computing resources providers include, but are not limited to Amazon® Web Services (AWS®), Microsoft's Azure®, IBM Cloud®, Google Cloud®, Oracle Cloud® etc.

Services provided by a computing resources provider 828 include, but are not limited to, data analytics, data storage, archival storage, big data storage, virtual computing (including various scalable VM architectures), blockchain services, containers (e.g., application encapsulation), database services, development environments (including sandbox development environments), e-commerce solutions, game services, media and content management services, security services, serverless hosting, virtual reality (VR) systems, and augmented reality (AR) systems. Various techniques to facilitate such services include, but are not be limited to, virtual machines, virtual storage, database services, system schedulers (e.g., hypervisors), resource management systems, various types of short-term, mid-term, long-term, and archival storage devices, etc.

As may be contemplated, the systems such as service 830 and service 832 may implement versions of various services (e.g., the service 812 or the service 826) on behalf of, or under the control of, computing device 802 and/or computing device 824. Such implemented versions of various services may involve one or more virtualization techniques so that, for example, it may appear to a user of computing device 802 that the service 812 is executing on the computing device 802 when the service is executing on, for example, service 830. As may also be contemplated, the various services operating within the computing resources provider 828 environment may be distributed among various systems within the environment as well as partially distributed onto computing device 824 and/or computing device 802.

In an embodiment, the computing device 802 can be connected to one or more additional computing devices and/or services such as merchant computing device 836 and/or a point-of-sale service 834 via the network 822 and using a connection such as the network interface 820. In an embodiment, the point-of-sale service 834 is separate from the merchant computing device 836. In an embodiment, the point-of-sale service 834 is executing on the merchant computing device 836. In an embodiment, the point-of-sale service 834 is executing as one or more services (e.g., the service 830 and/or the service 832) operating within the environment of the computing resources provider. As used herein, a point-of-sale service 834 is a service used by one or more merchants to manage sales transactions for customers, to process payment transactions for customers (e.g., credit card transactions), to manage inventory for merchants, to identify customers based on, for example, customer loyalty programs, and other such tasks.

In an embodiment, a customer and/or a merchant uses the merchant computing device 836 to interact with the point-of-sale service 834. In an embodiment, the merchant computing device 836 is a dedicated point-of-service (POS) terminal. In an embodiment, the merchant computing device 836 is a cash register system. In an embodiment, the merchant computing device 836 is an application or web service operating on a computing device such as the computing device 802 described herein. In such an embodiment, the application or web service may be provided by a financial services system (e.g., a bank, a transaction processing system, an inventory management system, or some other such financial services system). In an embodiment, the merchant computing device 836 includes an auxiliary device or system to execute tasks associated with the point-of-sale service 834 (e.g., a credit card processing device attached to a smart phone or tablet). In an embodiment, the merchant computing device 836 is a kiosk that is located at a merchant location (e.g., in a merchant's "brick and mortar" store), in a high traffic area (e.g., in a mall or in an airport concourse), or at some other such location. In such an embodiment, the kiosk may include additional branding elements to allow associating the kiosk with a vendor or retailer. In an embodiment, the merchant computing device 836 is a virtual device (e.g., a virtual kiosk) such as the virtual devices described herein. Although not illustrated here, in an embodiment, the merchant computing device 836 may be one of a plurality of devices that may be interconnected using a network such as the network 822.

Client devices, user devices, computer resources provider devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things such as those described herein. The input devices can include, for example, a keyboard, a mouse, a keypad, a touch interface, a microphone, a camera, and/or other types of input devices including, but not limited to, those described herein. The output devices can include, for example, a display screen, a speaker, a haptic feedback system, a printer, and/or other types of output devices including, but not limited to, those described herein. A data storage device, such as a hard drive or flash memory, can enable the computing device to store data temporarily or permanently. A network interface, such as a wireless or wired interface, can enable the computing device to communicate with a network. Examples of computing devices (e.g., the computing device 802) include, but are not limited to, desktop computers, laptop computers, server computers, hand-held computers, tablets, smart phones, personal digital assistants, digital home assistants, wearable devices, smart devices, and combinations of these and/or other such computing devices as well as machines and apparatuses in which a computing device has been incorporated and/or virtually implemented.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described herein. The computer-readable data storage medium may form part of a computer program product, which may include packaging materials. The computer-readable medium may comprise memory or data storage media, such as that described herein. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices (e.g., a combination of a DSP and a microprocessor), a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

As used herein, the term "machine-readable media" and equivalent terms "machine-readable storage media," "computer-readable media," and "computer-readable storage media" refer to media that includes, but is not limited to, portable or non-portable storage devices, optical storage devices, removable or non-removable storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), solid state drives (SSD), flash memory, memory or memory devices.

A machine-readable medium or machine-readable storage medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like. Further examples of machine-readable storage media, machine-readable media, or computer-readable (storage) media include but are not limited to recordable type media such as volatile and non-volatile memory devices, floppy and other removable disks, hard disk drives, optical disks (e.g., CDs, DVDs, etc.), among others, and transmission type media such as digital and analog communication links.

As may be contemplated, while examples herein may illustrate or refer to a machine-readable medium or machine-readable storage medium as a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies modules of disclosed herein.

Some portions of the detailed description herein may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

It is also noted that individual implementations may be described as a process which is depicted as a flowchart, a flow diagram, a data flow diagram, a structure diagram, or a block diagram. Although a flowchart, a flow diagram, a data flow diagram, a structure diagram, or a block diagram may describe the operations as a sequential process, many of the operations can be performed in parallel or concurrently. In addition, the order of the operations may be re-arranged. A process illustrated in a figure is terminated when its operations are completed, but could have additional steps not included in the figure. A process may correspond to a method, a function, a procedure, a subroutine, a subprogram, etc. When a process corresponds to a function, its termination can correspond to a return of the function to the calling function or the main function.

In some embodiments, one or more implementations of an algorithm such as those described herein may be implemented using a machine learning or artificial intelligence algorithm. Such a machine learning or artificial intelligence algorithm may be trained using supervised, unsupervised, reinforcement, or other such training techniques. For example, a set of data may be analyzed using one of a variety of machine learning algorithms to identify correlations between different elements of the set of data without supervision and feedback (e.g., an unsupervised training technique). A machine learning data analysis algorithm may also be trained using sample or live data to identify potential correlations. Such algorithms may include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Other examples of machine learning or artificial intelligence algorithms include, but are not limited to, genetic algorithms, backpropagation, reinforcement learning, decision trees, liner classification, artificial neural networks, anomaly detection, and such. More generally, machine learning or artificial intelligence methods may include regression analysis, dimensionality reduction, metalearning, reinforcement learning, deep learning, and other such algorithms and/or methods. As may be contemplated, the terms "machine learning" and "artificial intelligence" are frequently used interchangeably due to the degree of overlap between these fields and many of the disclosed techniques and algorithms have similar approaches.

As an example of a supervised training technique, a set of data can be selected for training of the machine learning model to facilitate identification of correlations between members of the set of data. The machine learning model may be evaluated to determine, based on the sample inputs supplied to the machine learning model, whether the machine learning model is producing accurate correlations between members of the set of data. Based on this evaluation, the machine learning model may be modified to increase the likelihood of the machine learning model identifying the desired correlations. The machine learning model may further be dynamically trained by soliciting feedback from users of a system as to the efficacy of correlations provided by the machine learning algorithm or artificial intelligence algorithm (i.e., the supervision). The machine learning algorithm or artificial intelligence may use this feedback to improve the algorithm for generating correlations (e.g., the feedback may be used to further train the machine learning algorithm or artificial intelligence to provide more accurate correlations).

The various examples of flowcharts, flow diagrams, data flow diagrams, structure diagrams, or block diagrams discussed herein may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments) such as those described herein. A processor(s), implemented in an integrated circuit, may perform the necessary tasks.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

It should be noted, however, that the algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC (e.g., an iPad®, a Microsoft Surface®, a Chromebook®, etc.), a laptop computer, a set-top box (STB), a personal digital assistant (PDA), a mobile device (e.g., a cellular telephone, an iPhone®, and Android® device, a Blackberry®, etc.), a wearable device, an embedded computer system, an electronic book reader, a processor, a telephone, a web appliance, a network router, switch or bridge, or any system capable of executing a set of instructions (sequential or otherwise) that specify actions to be taken by that system. The system may also be a virtual system such as a virtual version of one of the aforementioned devices that may be hosted on another computer device such as the computer device 1802.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting or restricting the subject matter to the precise forms disclosed. Persons skilled in the relevant art can appreciate that many modifications and variations are possible in light of the above disclosure and may be made thereto without departing from the broader scope of the embodiments as set forth herein. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

As used herein, the terms "a" and "an" and "the" and other such singular referents are to be construed to include both the singular and the plural, unless otherwise indicated herein or clearly contradicted by context.

As used herein, the terms "comprising," "having," "including," and "containing" are to be construed as open-ended (e.g., "including" is to be construed as "including, but not limited to"), unless otherwise indicated or clearly contradicted by context.

As used herein, the recitation of ranges of values is intended to serve as a shorthand method of referring individually to each separate value falling within the range, unless otherwise indicated or clearly contradicted by context. Accordingly, each separate value of the range is incorporated into the specification as if it were individually recited herein.

As used herein, use of the terms "set" (e.g., "a set of items") and "subset" (e.g., "a subset of the set of items") is to be construed as a nonempty collection including one or more members unless otherwise indicated or clearly contradicted by context. Furthermore, unless otherwise indicated or clearly contradicted by context, the term "subset" of a corresponding set does not necessarily denote a proper subset of the corresponding set but that the subset and the set may include the same elements (i.e., the set and the subset may be the same).

As used herein, use of conjunctive language such as "at least one of A, B, and C" is to be construed as indicating one or more of A, B, and C (e.g., any one of the following nonempty subsets of the set {A, B, C}, namely: {A}, {B}, {C}, {A, B}, {A, C}, {B, C}, or {A, B, C}) unless otherwise indicated or clearly contradicted by context. Accordingly, conjunctive language such as "as least one of A, B, and C" does not imply a requirement for at least one of A, at least one of B, and at least one of C.

As used herein, the use of examples or exemplary language (e.g., "such as" or "as an example") is intended to illustrate embodiments more clearly and does not impose a limitation on the scope unless otherwise claimed. Such language in the specification should not be construed as indicating any non-claimed element is required for the practice of the embodiments described and claimed in the present disclosure.

As used herein, where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described herein. The elements and acts of the various examples described herein can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described herein to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that the same element or similar elements can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described herein may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use.

What is claimed is:

1. A computer-implemented method, comprising:
    initiating, by a user computing device, a user application session;
    receiving an access token, wherein the access token is configured to facilitate communications via calls to an application programming interface (API);
    transmitting a key request, wherein the key request includes a user public key and the access token;
    receiving a service provider public key;
    encrypting fields of an API call using the service provider public key to generate encrypted API call fields;
    transmitting the encrypted API call fields, wherein when the encrypted API call fields are received by a service provider system via the API, the encrypted API call fields are decrypted and used to execute an API action by the service provider system.

2. The computer-implemented method of claim 1, further comprising:
    transmitting an authentication request to initiate the user application session; and
    receiving notification of a successful authentication.

3. The computer-implemented method of claim 1, wherein the access token is associated with an expiration time limit.

4. The computer-implemented method of claim 1, wherein when the access token expires, the access token, the service provider public key, the user public key, and a user private key are discarded.

5. The computer-implemented method of claim 1, further comprising transmitting an API call result obtained based on performing the API action, wherein the API call result includes an encrypted result field based on a result field being associated with an encryption indicator.

6. The computer-implemented method of claim 1, wherein the encrypted API call fields are encrypted based on an associated encryption indicator.

7. The computer-implemented method of claim 1, further comprising:
    receiving an updated service provider public key based on the access token is expiring and the user application session remaining active.

8. A user computing device, comprising:
    a memory configured to store a user application; and
    one or more processors coupled to the memory and configured to perform operations including:
    initiating a user application session;
    receiving an access token, wherein the access token is configured to facilitate communications via calls to an application programming interface (API);
    transmitting a key request, wherein the key request includes a user public key and the access token;
    receiving a service provider public key;
    encrypting fields of an API call using the service provider public key to generate encrypted API call fields;
    transmitting the encrypted API call fields, wherein when the encrypted API call fields are received by a service provider system via the API, the encrypted API call fields are decrypted and used to execute an API action by the service provider system.

9. The user computing device of claim 8, wherein the one or more processors are configured for operations further comprising:
    transmitting an authentication request to initiate the user application session; and
    receiving notification of a successful authentication.

10. The user computing device of claim 8, wherein the access token is associated with an expiration time limit.

11. The user computing device of claim 8, wherein when the access token expires, the access token, the service provider public key, the user public key, and a user private key are discarded.

12. The user computing device of claim 8, wherein the one or more processors are configured for operations further comprising:
   transmitting an API call result obtained based on performing the API action, wherein the API call result includes an encrypted result field based on a result field being associated with an encryption indicator.

13. The user computing device of claim 8, wherein the encrypted API call fields are encrypted based on an associated encryption indicator.

14. The user computing device of claim 8, wherein the one or more processors are configured for operations further comprising:
   receiving an updated service provider public key based on the access token is expiring and the user application session remaining active.

15. A non-transitory storage medium comprising instructions that, when executed by one or more processors of a user computing device, cause the user computing device to perform operations comprising:
   initiating a user application session;
   receiving an access token, wherein the access token is configured to facilitate communications via calls to an application programming interface (API);
   transmitting a key request, wherein the key request includes a user public key and the access token;
   receiving a service provider public key;
   encrypting fields of an API call using the service provider public key to generate encrypted API call fields;
   transmitting the encrypted API call fields, wherein when the encrypted API call fields are received by a service provider system via the API, the encrypted API call fields are decrypted and used to execute an API action by the service provider system.

16. The non-transitory storage medium of claim 15, wherein the instructions further cause the user computing device to perform operations comprising:
   transmitting an authentication request to initiate the user application session; and
   receiving notification of a successful authentication.

17. The non-transitory storage medium of claim 15, wherein the access token is associated with an expiration time limit.

18. The non-transitory storage medium of claim 15, wherein when the access token expires, the access token, the service provider public key, the user public key, and a user private key are discarded.

19. The non-transitory storage medium of claim 15, wherein the encrypted API call fields are encrypted based on an associated encryption indicator.

20. The non-transitory storage medium of claim 15 wherein the instructions further cause the user computing device to perform operations comprising:
   receiving an API call result obtained based on performing the API action, wherein the API call result includes an encrypted result field based on a result field being associated with an encryption indicator.

* * * * *